US008844226B2

(12) United States Patent
Harkins

(10) Patent No.: US 8,844,226 B2
(45) Date of Patent: Sep. 30, 2014

(54) SOLAR HEAT PUMP BUILDING

(76) Inventor: Daniel J. Harkins, Port Charlotte, FL (US)

(*) Notice: Subject to any disclaimer, the term of this patent is extended or adjusted under 35 U.S.C. 154(b) by 0 days.

(21) Appl. No.: 13/616,274

(22) Filed: Sep. 14, 2012

(65) Prior Publication Data

US 2014/0075858 A1 Mar. 20, 2014

(51) Int. Cl.
*E04B 1/70* (2006.01)
*E04F 17/00* (2006.01)
*E04B 1/74* (2006.01)
*E04B 1/00* (2006.01)
*E04D 13/18* (2014.01)
*F24F 7/00* (2006.01)

(52) U.S. Cl.
USPC ...... 52/302.1; 52/407.3; 52/742.12; 126/621; 454/185

(58) Field of Classification Search
USPC ............ 52/95, 198, 273, 407.1, 407.3, 404.1, 52/742.12, 404.3, 404.2, 302.1, 302.3, 52/408; 126/621, 622, 643, 646; 454/185, 454/333
See application file for complete search history.

(56) References Cited

U.S. PATENT DOCUMENTS

| | | | |
|---|---|---|---|
| 3,398,491 A * | 8/1968 | Babcock | 52/90.1 |
| 3,537,378 A * | 11/1970 | Daly | 454/337 |
| 4,006,856 A * | 2/1977 | Nilsson | 126/591 |
| 4,020,989 A * | 5/1977 | Kautz | 126/616 |
| 4,222,212 A | 9/1980 | Alderman | |
| 4,286,420 A * | 9/1981 | Pharmakidis | 52/404.1 |
| 4,295,415 A * | 10/1981 | Schneider, Jr. | 454/185 |
| 4,418,685 A * | 12/1983 | Frazier | 126/628 |
| 4,446,664 A | 5/1984 | Harkins | |
| 4,512,130 A * | 4/1985 | Pepin | 52/404.2 |
| 4,573,298 A * | 3/1986 | Harkins | 52/404.3 |
| 4,635,423 A * | 1/1987 | Ward | 52/746.1 |
| 4,676,145 A * | 6/1987 | Allred | 454/276 |
| 5,636,487 A * | 6/1997 | Fligg | 52/404.5 |
| 5,653,081 A | 8/1997 | Wenrick et al. | |
| 5,921,057 A | 7/1999 | Alderman et al. | |
| 5,953,875 A * | 9/1999 | Harkins | 52/407.3 |
| 5,968,311 A | 10/1999 | Zupon, Jr. et al. | |
| 5,988,264 A * | 11/1999 | Goldsmith | 165/48.1 |
| 6,061,978 A * | 5/2000 | Dinwoodie et al. | 52/173.3 |
| 6,122,867 A * | 9/2000 | Leconte | 52/144 |
| 6,216,416 B1 | 4/2001 | West et al. | |
| 6,393,797 B1 * | 5/2002 | Romes | 52/746.1 |
| 6,780,099 B1 * | 8/2004 | Harper | 454/186 |
| 6,843,718 B2 * | 1/2005 | Schmitz | 454/186 |
| 7,219,473 B2 * | 5/2007 | Mantyla et al. | 52/198 |
| 8,047,905 B2 * | 11/2011 | Everett et al. | 454/187 |
| 2005/0090195 A1 * | 4/2005 | Place et al. | 454/298 |
| 2005/0199234 A1 * | 9/2005 | Leighton | 126/621 |

(Continued)

*Primary Examiner* — Ryan Kwiecinski
(74) *Attorney, Agent, or Firm* — Donald J. Ersler

(57) ABSTRACT

A solar heat pump building preferably includes a building, an air barrier insulation layer, a material insulation layer and a plurality of ducts. The air barrier insulation layer includes a ceiling air barrier insulation layer and a wall air barrier insulation layer. The ceiling air barrier insulation layer is a ceiling air gap created between a ceiling sheet and a roof panel. The wall air barrier insulation layer is a wall air gap created between the ceiling sheet and two opposing lengthwise wall panels, and two inner end wall sheets and two opposing end wall panels. Two lengthwise wall insulation layers are attached to vertical portions of the ceiling sheet. Two end wall insulation layers are attached to the two inner end wall sheets. A plurality of ducts include lengthwise ducts and end ducts, which are retained in the wall air barrier insulation layer to channel air.

16 Claims, 22 Drawing Sheets

(56) References Cited

U.S. PATENT DOCUMENTS

| | | | |
|---|---|---|---|
| 2007/0227088 A1* | 10/2007 | O'Hanley | 52/407.1 |
| 2010/0101153 A1* | 4/2010 | Pollack | 52/22 |
| 2011/0173913 A1* | 7/2011 | Bodsford et al. | 52/407.4 |

* cited by examiner

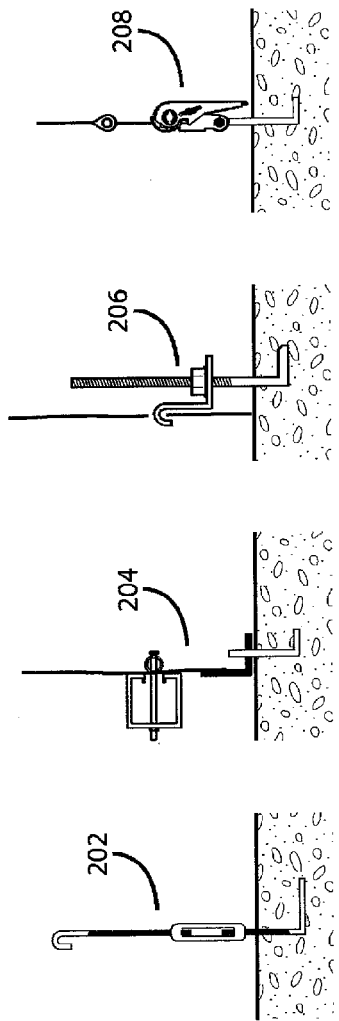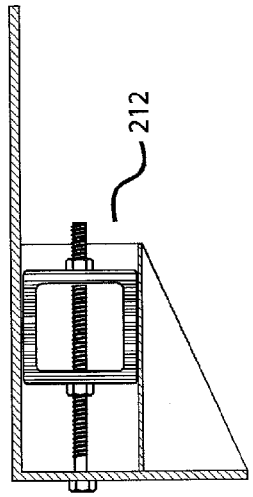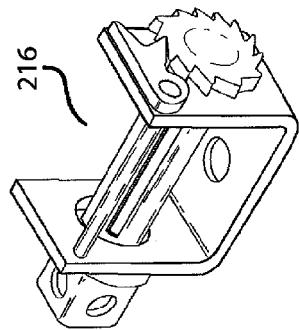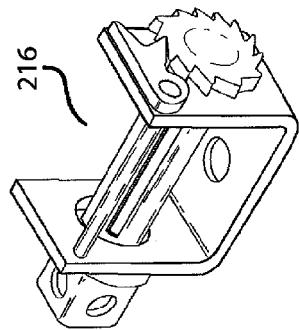

SOLAR HEAT PUMP BUILDING

BACKGROUND OF THE INVENTION

1. Field of the Invention

The present invention relates generally to energy efficient buildings and more specifically to a solar heat pump building, which requires less energy to heat and cool than that of the prior art and which removes humidity typically trapped in the walls, roof and insulation of the building.

2. Discussion of the Prior Art

A brochure MB304 published by the North American Insulation Manufacturers Association (NAIMA) continuously since 1991 describes the state of the art most typically used to insulate roofs and walls of pre-engineered metal buildings. This type of building currently represents over 40% of all non-residential buildings of two stories or less built in the US each year.

U.S. Pat. No. 4,446,664 to Harkins discloses a building insulation system. U.S. Pat. No. 4,573,298 to Harkins discloses a building insulation system. U.S. Pat. No. 5,953,875 of Harkins discloses a slide-in building insulation system. U.S. Pat. No. 6,247,288 to Harkins discloses a roof fabric dispensing device for insulation systems and air barriers over the exterior plane of the building structural members. U.S. Pat. No. 5,968,311 is a device for installing a vapor retarder over the purlins or joist to support insulation. U.S. Pat. No. 6,705,059 is a rolled fabric carriage device for unrolling a vapor retarding fabric over the tops of purlins which is used to support insulation. U.S. Pat. No. 6,216,416 is a system for installing insulation over purlins. U.S. Pat. No. 5,921,057 is an apparatus for dispensing an insulation support sheet over the purlins. U.S. Pat. No. 5,653,081 is a method for paying out an insulation support sheet for insulating a building roof over the purlins. U.S. Pat. No. 4,222,212 is an insulated roof over the purlins. There are temporary buildings, which have a waterproof coverings over the tops of framing members to form a roof covering and which are commonly used for agricultural and storage purposes.

One common problem with the design of current buildings having integrated thermal insulation systems is the requirement for structural fastening of the insulation support apparatus through the plane of the insulation system. The "through-fastening" creates multiple thermal bridges, which reduces the building thermal performance up to fifty percent. The most predominant methods used to insulate pre-engineered metal buildings from as early as the 1950s, until today is simply draping the insulation over the exterior of the building structural members for support, applying the exterior building sheeting directly over the insulation and then applying the exterior sheeting attachment fasteners through the exterior sheeting, through the insulation from the exterior into the underlying building roof and wall structural members. This method results in thermal bridging fasteners with a frequency of about one fastener per every ten square feet of exterior surface area or less.

A second common problem is that insulation products in building roofs and walls are sandwiched between the roof or wall structural members and the overlying building exterior sheeting with compression of the insulation thickness and its inherent loss of thermal performance which results from this compression. Placing the roof and wall insulation tightly against the exterior roof and wall sheeting panels blocks the solar heat energy from being absorbed and radiated off the interior surface of the sheeting materials for any practical use. The solar energy that hits the building roof and wall surfaces is lost from any practical collection and use. At the same time, fossil fuel energy is purchased to provide heating, cooling and hot water heating for the building occupants and processes.

A third common problem of achieving energy efficient buildings is that the thermal insulation has traditionally been installed during the roof and wall sheeting process. Insulation methods which require the installation of fasteners from the interior during the integrated insulation and exterior sheeting process are shunned by installers of these materials in favor of methods that simply compress the insulation between the roof or wall structural members and the roof or wall sheeting with only exterior applied fasteners. Such methods eliminate the need for fastening from the interior side of the roof and wall structure during the insulation and sheeting process and therefore are preferred by installers.

This practice severely limits the thermal performance of the buildings to much less than the desirable economic insulation performance levels. Due to the insulation thickness reductions and thermal bridging, building thermal performance is much less than what is required to honestly meet the minimum installed thermal performance criteria set forth by the various state energy codes. The most common building insulation methods not only compress the insulation thickness by variable percentages, but also thermally bridge the exterior conductive building sheeting surfaces to the interior exposed thermally conductive surfaces of the purlins, joists and girts. These structural configurations maximize the uncontrolled heat transfer between the two thermally bridged surfaces on the opposite sides of the thermal insulation layer and will frequently result in seasonal condensation on the interior exposed building structural members. The roof and wall structural members become very hot in the summer, when the heat is not wanted in the building interior conditioned space and are cold in the winter, when the heat is wanted in the building interior conditioned. Buildings that are thermally bridged between through the thermal insulation with exterior exposed conductive sheeting materials and interior exposed conductive roof purlins or joist and exposed conductive wall girts result in the opposite seasonal heat transfer effect that is desired and major loss of heating energy.

The cold exterior surface temperatures in the winter typically float up and down crossing over the dew point temperature of the interior conditioned air and also of the dew point temperature of the air trapped within the insulation of the roof and wall assemblies of the building. Fiberglass insulation is mostly air. This condition results in condensation of the water vapor that increases conductivity and reduces the insulation thermal performance, which may result in permanent building structural damage and may also interfere with the building use. If the condensed liquid water accumulates within the building roof and wall assemblies it may also result in dripping and damage to interior building contents.

Prior art like that disclosed in the Harkins U.S. Pat. No. 4,446,664 invention uses a steel strap support system, which temporarily spans across building bays with steel straps fastened at their ends and often installed in a woven mesh. A flexible sheet material is custom fabricated to fit the designated building areas, referred to as building bays, with the absolute minimum of field seams except along the building bay perimeter beams, where there is no problem sealing the edges as the workmen work on the top side of the rafter beams. The flexible sheet material is spread out and clamped in position on the platform of spanned support strapping and then fasteners are required to be installed through the steel straps and sheet material from the building interior into the inside flanges of building roof purlins or joist. This method requires approximately one interior applied fastener for every 30 square feet of the building roof or wall structures. Each fastener is a thermal bridge between the steel strapping and the overlying metal roof structure to which it is attached.

The invention of the U.S. Pat. No. 4,446,664 creates a defined space for insulation to expand, which eliminates virtually all unwanted compression of the insulation in the roof structures. This method also completely isolates all-of-the highly conductive metal roof purlin or joist surfaces and wall girts surfaces from direct contact with the interior conditioned air. This system however requires the installation of the fasteners from the interior of the building during the integrated process of installing the insulation and the sheeting of the building's exterior roof surfaces. The Harkins '664 patent, while much more thermally efficient than typical over-the-purlin methods, is often avoided in favor of much less thermally efficient insulation products and methods which do not require fasteners to be installed from the building interior during the integrated roof insulation and exterior roof sheeting process.

Another problem that occurs in metal panel sheeted buildings is seasonal condensation problems in the wall and roof systems. This phenomenon becomes particularly evident with metal-sheeted buildings because the metal panel temperatures change almost instantly with a change in exterior temperatures. Typically, water vapor within the building interior conditioned space concentrates along with a natural heat gradient at the highest elevations within the building heated space. The concentration of water vapor in air is often measured and expressed as relative humidity. The warmer the air mixture is, the more the weight of water, in vapor form, it can hold. Water vapor will condense on any surface of the building structure it contacts, which is below its dew point temperature. The dew point temperature is the temperature at which the relative humidity of the air contacting the cooler surface will reach 100% relative humidity and begin depositing the excess water vapor as liquid water on that cooler surface. A similar phenomenon occurs within an air mixture itself as it cools and this condensation manifests itself as fog, dew, rain and other forms of precipitation.

In buildings, water vapor will slowly migrate through the vapor retarders, through poorly sealed joints, through staple holes, through gaps, punctures, etc. and will condense on the interior surface of the exterior sheeting panels when the exterior surface temperatures are below the dew point temperature of the air mixture within the insulation space of the roof and wall assemblies of the building. The typical preferred insulation methods fill the roof and wall assemblies to the exterior sheeting and any moisture is therefore trapped inside of the wall and roof assemblies. The moisture may condense and may accumulate seasonally during cold temperatures. This trapped water vapor and resultant liquid water will cause premature deterioration of the building roof and wall building components and will shorten the useful life of the building if it can't escape naturally. Many older metal buildings leak air or breathe through the eave and wall flashings and the unsealed wall panel joints due to wind pressure differences. This breathing allowed much of the trapped water vapor to escape, but at the expense of thermal insulation performance. New energy code requirements for sealing all construction joints will essentially eliminate this typical water vapor escape mechanism resulting in a much greater potential for condensation and accumulation of liquid water within these building roof and wall assemblies of the future.

Buildings that have the compressed thermal insulation, buildings that attempt to fill the roof and wall cavities, buildings that have thousands of staple holes along uniformly spaced insulation facing seams, buildings that have substantially thermally bridged conductive interior and exterior surfaces, buildings that trap and accumulate condensed water vapor within the insulated roof and wall assemblies, and buildings which repel the free solar heat energy hitting its exterior surfaces require significantly greater heating and cooling equipment capacities, require excessive fuel piping, require excessive electrical wiring, require excessive utility service capacities and cost significantly more to heat, cool and ventilate than would be required, if the above mentioned problems were solved.

Accordingly, there is a clearly felt need in the art of buildings for a solar heat pump building, which provides the following useful advantages:

That creates a defined air gap space of sufficient air volume and distance between the roof and wall thermal insulation layer and the conductive exterior sheeting materials to operably manage the intrinsic air mixture, the air flows within and the collection of solar heat from the adjacent heat absorbing, conducting and radiating surfaces of the exterior building sheeting and of their thermally bridged roof purlins and wall girt structural members.

That creates a continuous insulation layers in entire building bays without having structural thermal bridging, nor having fasteners inserted through the insulation layer from below to support itself; an insulation layer that is supported completely from the interior side without the need for any fasteners installed from the interior during the integrated ceiling thermal insulation and exterior sheeting process of a building will solve the market resistance to the use of such systems.

That provides for the natural collection and concentration of heat energy within defined air gap spaces created within the roof and wall assemblies, which heat can be actively collected from the defined spaces by one of several methods and economically used to reduce energy consumption for the building, its occupants and related processes.

That provides for water vapor control within the defined roof and wall assembly spaces to concentrate the water vapor by natural means and to actively remove and collect the water from the roof and wall defined air gap spaces as required to eliminate damaging accumulation and allows the simple collection and use of the clean dehumidification water for various useful purposes.

That maximizes the absorption, collection and transfer of solar heat energy hitting the exterior surfaces of the building and to actively use the clean solar energy to reduce the consumption of purchased energy for the building interior space conditioning and related use processes. The colors and the emissivities of the roof and wall exterior sheeting panel surfaces can be selected to maximize the solar energy absorption, the transfer and the use of the free solar energy, as opposed to reflecting it back into the external environment with it's value completely wasted.

That use an active heat collection duct and piping systems installed at optimal locations within the defined air gap spaces created within the walls and roof assemblies as a source for concentrated heat to be used directly, with air circulation and/or indirectly through the use of a heat exchanger system such as a water pumping and storage system with fan-coil heat transfer units, baseboard type heating radiators, or the use of electric powered, refrigerant type of compressor driven electric heat pumps that collect heat from the pre-concentrated air within the solar wall and solar roof air gap layers, in lieu of using exterior unheated ambient air as a source for the heat energy it collects and transfers. Efficiencies of over 50 Btu's per watt are expected from this new solar heat pump building invention.

That would facilitate the collection, concentration and storage of the clean solar heat energy in water stored in insulated reservoirs for off peak demand use for space heating and hot water production processes. Excess heat energy collected can be used to melt snow and ice off roofs, driveways, sidewalks, etc. to eliminate typical removal costs, saving equipment costs, time and additional energy. The relatively clean water from snow and ice melting can also be collected, and recycled for many useful purposes.

That interconnects the wall solar energy air gap collection system to the roof solar energy air gap collection system which will facilitate the transfer of concentrated heat from the wall air gap to the roof air gap for the melting of snow and ice from the solar roof collection surfaces. A building roof may then be kept free of snow and ice by using solar heat energy collected in the wall air gap to maintain a solar exposed roof absorptive surface area exposed to direct solar energy, to absorb the maximum solar energy possible for collection in an adjacent air gap layer for a useful purposes.

That will use free solar heat from the solar wall collection system to eliminate ice damming on cold roof edges by keeping them free of ice accumulation caused by chronic build-up of ice from very slow melt of snow and ice off the exterior roof sheeting due to thermal bridging from the interior conditioned space and through the compressed thermal insulation.

That uses a subterranean air tubing and air conditioning system to pre-condition incoming ventilation air in all seasons to save energy and also to simultaneously remove water vapor from warm, humid, incoming air during the summer cooling season, thereby reducing both the latent and sensible cooling loads required to maintain the interior conditioned space temperature and humidity at desired comfort levels.

That simplifies the installation process and eliminates the requirement for any fastening from the interior of the building during the integrated process of installing the insulation support sheet material, the roof insulation and the exterior sheeting panels of the building roof.

That eliminates thermal bridging through the roof insulation to support the insulation layer.

That eliminates thermal bridging through the wall insulation layer for support of the insulation.

That reduces the need for energy for building environmental space conditioning to such a low level, that for practical investment payback reduces the building life cycle cost, renewable energy generation may be added to the building project so that it annually requires a net total of zero or less purchased energy for typical building conditioning and lighting loads, excluding other user loads, if any.

SUMMARY OF THE INVENTION

The present invention provides a solar heat pump building, which requires less energy to heat and cool than that of the prior art. The solar heat pump building preferably includes a building, at least one air gap heat collection layer, a tension supported flexible sheet material layer, a material insulation layer, a plurality of air ducts, a plurality of air duct dampers, a plurality of heat collection pipes, and an active mechanical heat pump collection, concentration, transfer and distribution system. The building is preferably a metal building, but other types of buildings may also be adapted for use with the invention. The typical metal building includes a plurality of rafter columns, a plurality of end columns, a plurality of girts, a plurality of girt clips, a plurality of rafters, a plurality of purlins, a plurality of purlin clips, a plurality roof panels, a plurality of wall panels, and a plurality of bolts, nuts, fasteners, flashings and sealants. The plurality of rafter columns and the plurality of end columns are attached to a foundation to form a perimeter of the metal building. The plurality of girts are retained by clips extending off the exterior surfaces of the rafter columns and by a plurality of girt clips extending off the exterior surfaces of the end wall columns with girts spanning between adjacent pairs of the plurality of rafter column girt clips and between adjacent pairs of the plurality of end wall column girt clips. The plurality of rafters are attached to a top of the plurality of rafter columns. Rafters are attached to the top of the building corner rafter columns at the end walls and also are attached between building corner rafters columns to the tops of a plurality of the end wall columns. The plurality of roof purlins are retained by a plurality of purlin clips extending above the exterior surface of the plurality of rafters. The plurality of ceiling support struts are retained spanning between, over or under, adjacent pairs of the plurality of rafters.

The solar heat pump building roof system includes the exterior roof sheeting panels, a purlin structural support system, an air gap heat collection layer, a material insulation layer, sheet material a strong sheet material, sheet material support struts and eave sheet material material support struts. Tensioned steel cables (not shown) may function as intermediate struts. Each ridge sheet material support strut is attached spanning between adjacent pairs of rafters and supported by the rafters. At least one sheet material support strut is attached below a ridge of the building roof and defines the inside sheet material ceiling line below the ridge. Each sheet material eave support strut is attached in an inside corner between two adjacent rafters/rafter columns and defines the inside corner of the ceiling and wall junction of the sheet material in the building. For ease of installation a sheet material may extend continuously from a ridge sheet material support strut around the outside corner of an eave support strut to a termination point at a floor of the building or alternatively to a termination point created between the floor and the inside corner support strut. The ceiling sheet material is attached at opposing termination points with adhesive, a tensioning device or any other suitable attachment devices and methods. At least one tensioning device is preferred for each sheet material to control and manage deflection of the sheet material within desirable limits.

Alternatively, the sheet material extends from the floor of one side of the building around the exterior of one inside corner eave support strut, over a ridge support strut, around the exterior of the opposite wall inside corner eave support strut and downward for attachment to the floor on an opposing side of the building. Alternatively the ceiling sheet material may be terminated at an intermediate ceiling, eave or wall support strut. Intermediate support struts may be attached spanning between two adjacent roof rafters, between to adjacent rafter columns or between two wall girt clips.

The ceiling material insulation layer is inserted between at least one ceiling sheet material and a bottom of the plurality of roof sheets and preferably a bottom of the roof purlins with a air gap layer created to the exterior side of the material insulation layer. A plurality of vent spacer blocks may be attached to the interior and exterior facing flanges of the purlins prior to installation of the exterior metal roof panels. The vent spacer blocks have vent holes to insure the heat and convection air naturally flows between the roof air gap layer spaces between adjacent purlins within the solar heat pump building roof. The plurality of thermally conductive metal roof panels are attached to the outer surface flanges of a plurality of the roof purlins. The building air gap heat collection layer is thereby created between an outer surface of the ceiling insulation layer and the inside surface of the roof metal sheeting panels. The purlin clips on the rafters may be extended to provide the desired distance for the ceiling insulation layer without compression of the designed insulation thickness. The typical metal building ridge cap may be used to complete the roof at the building ridge but with less efficiency than the optional multi-vent. An optional ridge mounted multi-vent extends through a ridge of the roof and extends any length of the roof desired by the designer. The ridge mounted multi-vent replaces the typical metal building ridge cap and is located between two ridge purlins or at the high side of the building if the building is a single slope building. The multi-vent provides heat collection, heat concentration, heat transfer, ventilation, dehumidification, day-lighting and building management functions.

The solar heat pump building wall system preferably includes an exterior metal wall panel, thermally conductive metal girts, an air gap heat collection layer, vent spacer blocks on interior girt flanges, a first exterior sheet material which is typically an extension of the ceiling sheet material, a material insulation layer, a second interior sheet material which covers the wall material insulation layer from the exposure to the building interior space, and a means of using the concentrated heat within the air gap layer(s). The solar heat pump building end wall systems contain the same general components as a side wall system. The solar heat pump buildings preferably include a plurality of inner girt vent spacers and may also include a plurality of outer girt vent spacers containing a plurality of air vent holes to ensure the natural concentration of heat energy at the top of the wall air gap layer and allow convection air flows between girt spaces within the wall heat collection air gap layer of a system. Solar collected heat rises naturally and concentrates at the highest points of the wall and roof air gap layer(s) that it can achieve. A plurality of outer girt vent spacers may be attached to the exterior facing flanges of the girts prior to installation of the exterior metal wall sheeting panels. The inner girt vent spacers are attached to the interior facing flanges of the girts prior to installation of the first (exterior) sheet material which defines the interior surface of the wall air gap layer.

A plurality of rigid formed insulation hangers are then attached to the interior facing surface of the first (exterior) sheet material. A material insulation layer is attached in substantial contact without the interior-most surface of the first (exterior) wall sheet material using the pre-installed insulation hangers. The material insulation is impaled on the rigid formed insulation hangers designed for this purpose, which are completely supported by the exterior wall sheet material and not fastened to the building girts to eliminate thermal bridging to the material insulation layer. A top of each second (interior) wall sheet material is attached to the ceiling sheet material, such that it's outer surface is in substantial contact with an inner-most surface of the wall material insulation layer. A bottom of each interior wall sheet material is attached to floor with adhesives, tensioning device, or other suitable attachments means, such that it contacts the wall material insulation layer. The material insulation layer is thereby sandwiched between the first and second wall sheet materials. The solar heat collecting wall air gap layer is thereby created between an inner surface of the exterior wall panel and the outer surface of the first (exterior) wall sheet material.

The solar heat pump building wall heat collection air gap layer is preferably connected to the roof heat collecting air gap layer at their intersection at the building eave area so that the concentrated wall heat may be naturally transferred to the roof air gap layer, preferably on demand by using a damper system at this junction, and the wall heat energy therefore used to keep the building roof heat absorbing surfaces fully exposed to absorb solar energy by keeping the roof surfaces free of snow and ice with free solar heat.

The plurality of wall ducts include side wall ducts and end wall ducts. The plurality of side wall ducts preferably include two side wall eave line roof ducts, two side wall upper wall ducts, two side wall base ducts and two side wall subterranean air ducts. The plurality of end wall ducts preferably include two upper wall ducts and two end base wall ducts. Each duct includes a rectangular (preferably square) tube, which preferably includes a plurality of air flow holes formed through the sides thereof. A damper strip slot is formed in all four sides to receive a sliding damper strip. The damper strip also includes a plurality of air flow holes. The hole locations and hole sizes in the damper strip are engineered to equalize the collection (intake) and distribution (exhaust) of air flows evenly through the wall and roof air gap layers along the length of each duct to maximize the collection and concentration efficiency of heat energy of the solar heat pump building. A damper strip actuation device is used to open and close the plurality of air flow holes of the various air flow paths on demand by sliding the damper strips a damper slot of a duct. Duct end caps are used to enclose the air streams between the ends of duct sections as required.

Each side wall eave roof duct is located at the top of the wall air gap layer to communicate with the roof air gap layer. Each side wall upper wall duct is located immediately below a side wall eave roof duct and communicates with the wall air gap layer. The side wall eave roof ducts are capable of receiving outside air through its air flow holes or a branch duct which communicates the upper wall duct or with the outside air. The side wall eave roof ducts are also capable of receiving heat and air through its air flow holes or a branch duct which communicates with an upper side wall duct. The upper side wall ducts and upper end wall ducts collect heat energy and air from the respective wall heat collecting air gap layers through the air flow holes which communicate with the wall air gap layer below the respective upper wall ducts.

The side wall and end wall base ducts are at the base of the respective wall heat collecting air gap layers. A wall base duct is located adjacent the wall sheeting panel, above the floor with air flow holes which communicate with the wall air gap layer. A side wall or end wall base duct is capable of receiving outside air through its air flow holes or a branch duct which communicate with the outside air. The side wall or end wall base duct is also capable of receiving interior space air through its air flow holes or a branch duct which communicate with the interior space air. The side wall and end wall base ducts are capable of supplying air to the bottom end of the wall heat collection air gap layer from either the outside air or the inside air or both, through its air flow holes which communicate with the wall air gap layer. The air flows are preferably controlled by an active damper in a damper slot or in the branch duct as applicable.

Two subterranean air ducts are located adjacent to the interior foundation walls at two opposite building walls, at or below floor level and extend substantially the length of each respective opposing building wall. A wall subterranean air duct communicates with the interior space air through air flow holes or branch duct. The opposite subterranean air duct communicates with the outside ambient air through a branch duct, containing a damper and an internal, air stream mounted fan powered by energy. A plurality of subterranean tubing is located below a floor of the building preferably at a depth of six to eight feet with each opposing tube end connected to the opposing subterranean duct located near the floor adjacent to the opposing foundation walls of the building. Warm outside air flowed through the plurality of subterranean ducts and subterranean tubing will be cooled by a cooler ground temperatures during the cooling season. Outside warm humid air flowed through a plurality of subterranean ducts and subterranean tubes will be naturally dehumidified by the cooler earth ground temperatures during the cooling season. Cooler air flowed through the plurality of subterranean ducts and subterranean tubes will be warmed by a warmer earth ground temperature during the heating season.

It is preferable that the plurality of subterranean ducts be oriented either parallel to the ends of the building or parallel to the sides of a building which are substantially opposite each other and the plurality of the subterranean tube ends connect between the to opposing wall subterranean ducts.

It is preferred that each subterranean tube be sloped to a low point and connected to a common drain pipe to collect seasonal condensation and pipe it to run by gravity to a common collection reservoir for recycling for other uses.

The ridge mounted multi-vent device includes a plurality of vent modules attached in series. The plurality of vent modules are connected to each other end-to-end with any suitable attachment device or method such as installing bolts or screws. Each vent module includes a box unit. The box unit includes a vent base, two end walls, two side walls and two box side flanges. The two end walls extend upward from opposing ends of the vent base and the two side walls extend upward from opposing sides of the vent base. A single flange extends outward from a top of each box side wall. At least one opening is formed through each end wall to allow the flow of air between adjacent modules. A hole may also be formed through each end wall to receive a heat collecting pipe apparatus. This pipe apparatus would include pipe, heat collecting fins, condensation collecting trough, joint connectors, support brackets and drain tubing.

The top and bottom covers include a cover portion and a pair of cover side flanges. The cover side flange extends from each side of the cover portion. A sealing material may be placed between the cover side flanges and the box side flanges. A sealing material may be placed between the cover ends and the box end panels. The cover is fabricated from a material, which is light collecting, light diffusing, light transmitting, light concentrating, light reflecting or opaque to light. The box unit may have side wall and end wall wall extensions with are adapted to make the overall height of the box unit fit the thickness of the building roof assembly to close any air leaks between the interior space air and the roof air gap layer.

Damper strip slots are formed in the box side wall panels to receive a sliding damper strip similar to that of the wall ducts. A plurality of air flow holes are formed through the box side wall panels within the slot. The damper strip includes a plurality air flow holes, which generally align with the plurality air flow holes in the box unit side walls. A continuous damper strip may be installed spanning between multiple multi-vent modules to be operated by a single damper actuator. The damper strip may be shifted in the damper slot with a damper strip actuation device to allow the air flow holes to be opened or closed to any degree by sliding a damper strip in the damper slot. The collected solar heat entering the multi-vent is naturally concentrated from the roof solar heat collection air gap layer of the roof on either side of the ridge or both. The solar heat collected in the wall air gap layer may be extracted at the top of the wall air gap layer or passed on upward into the roof solar heat collection air gap layer to be carried further upward and concentrated in the multi-vent for extraction for direct use as heated air, for extraction for indirect use by a heat absorption pipe of a heat pump for space heating, for heating process water, for the generation of power, for other useful purposes or may simply exhausted to the atmosphere to cool the building roof. The multi-vent forms a heat and air collection duct when joined end-to-end which can be connected to an in-line branch duct containing a powered fan or to an air handler unit to efficiently move and concentrate the solar heated air through the solar heat pump building air gap layers for useful purposes, rather than simply wasted as is the current state of the art.

Accordingly, it is an object of the present invention to provide a solar heat pump building, which creates an air gap layer between the roof and wall thermal insulation layer and the conductive exterior sheeting and framing materials to operably manage the intrinsic air mixtures, the air flows and the collection of solar heat from the adjacent heat absorbing surfaces of the exterior building sheeting panels which may be thermally bridged to roof and wall purlins and girts.

It is a further object of the present invention to provide a solar heat pump building, which creates a continuous insulation layer without having structural thermal bridged fasteners inserted through the insulation layer to retain the insulation system layer.

It is another object of the present invention to provide a building structure, which has an insulation layer without fasteners being installed from the interior side through the sheet material to the roof purlins or wall girt framing.

It is yet a further object of the present invention to provide method of installation, which does not require the installation of bottom side fasteners during the process of installation of the insulation and roofing of a building.

It is yet a further object of the invention to provide a method of installation of a ceiling sheet by tensioning a sheet material over underlying support struts to safely support the designed loads below the purlin or joist structures of a building without the need for fasteners to be installed from the interior side during the process of installing insulation and roof sheeting materials to complete a building roof sheeting system.

It is yet a further object of the invention to provide a structure with a tensioned ceiling sheet that will provide fall protection safety for workmen installing building construction materials above the upper surface of an installed tensioned ceiling sheet.

It is yet a further object of the invention to provide a tensioned ceiling sheet system structure which will support a 400 pound weight object, nominally 30 inches plus or minus two inches in diameter, dropped from height not less than 42 inches above the plane of the tensioned ceiling sheet without the weight falling more than six feet below the bottom plane of the sheet.

It is yet a further object of this invention to provide an installer safe fall prevention feature employing a tensioned ceiling sheet building structure that will support in tension, between opposing attachment points, a minimum of 1000 pounds of static weight superimposed on a upper side of the sheet material.

It is yet a further object of the present invention to provide a solar heat pump building structure which provides for the natural concentration of heat energy within the defined air gap spaces created within the roof or wall assemblies, where heat can be actively collected from the defined spaces by any of several methods and used to reduce energy consumption for the building, its occupants and for other processes.

It is yet a further object of the present invention to provide a solar heat pump building structure for water vapor collection and control within the roof and wall defined air gap layer spaces to concentrate the water vapor by natural means and actively condense and collect the liquid water from the roof and wall defined air gap layer spaces of the building.

It is yet a further object of the present invention to provide a solar heat pump building structure, which maximizes the absorption, collection and transfer of solar heat energy hitting the exterior surfaces of the building for the active use of the solar energy to reduce the consumption of purchased energy for the building interior space conditioning and processes.

It is yet a further object of the present invention to provide a solar heat pump building structure, which uses an active heat collection piping system installed at optimal locations within the defined air gap spaces created within a wall or roof assembly as a source for naturally concentrated heat energy to be used directly with active air circulation and/or through the use of an indirect heat exchanger system.

It is yet a further object of the present invention to provide a solar heat pump building, which would facilitate the collection, concentration and storage of the solar heat energy in water stored in reservoirs for off peak demand use for space heating and for hot water processes.

It is yet a further object of the present invention to provide a solar heat pump building, which uses a subterranean air tubing as an air conditioning system to pre-condition incoming ventilation air in any season to save energy and to also to simultaneously remove water vapor from incoming humid air.

Finally, it is another object of the present invention to provide a solar heat pump building, which reduces the need for energy for the building environmental space conditioning to such a low level, that for very practical investment, renewable energy generation may be added to the building so that it annually requires zero or less net purchased energy for typical space conditioning and lighting needs excluding other user loads.

These and additional objects, structures, advantages, features and benefits of the present invention will become apparent from the following specification.

BRIEF DESCRIPTION OF THE DRAWINGS

FIG. 4a is an enlarged cross sectional end view of a ridge ceiling support strut for retaining a ceiling sheet material in a metal building with a termination of the sheet material at one of two adjacent ridge ceiling sheet material support struts in accordance with the present invention.

FIG. 4b is an enlarged cross sectional end view of an eave inside corner support strut for retaining a ceiling sheet material in a metal building in accordance with the present invention.

FIG. 10a is a turnbuckle tensioning device for tensioning a wall or ceiling sheet material.

FIG. 10b is a right angle take-up tensioning device for tensioning a wall or ceiling sheet material.

FIG. 10c is a hook and treaded rod tensioning device for tensioning a wall or ceiling sheet material.

FIG. 10d is a ratchet strap tensioning device for tensioning a wall or ceiling sheet material.

FIG. 10e is a turning shaft tensioning device for tensioning a wall or ceiling sheet material.

FIG. 10f is a single adjustable strut tensioning device for tensioning a wall or ceiling sheet material.

FIG. 10g is a bidirectional adjustable strut tensioning device for tensioning a wall or ceiling sheet material.

FIG. 10h is a strap winch tensioning device for tensioning a wall or ceiling sheet material.

DETAILED DESCRIPTION OF THE PREFERRED EMBODIMENTS

Figure 1:
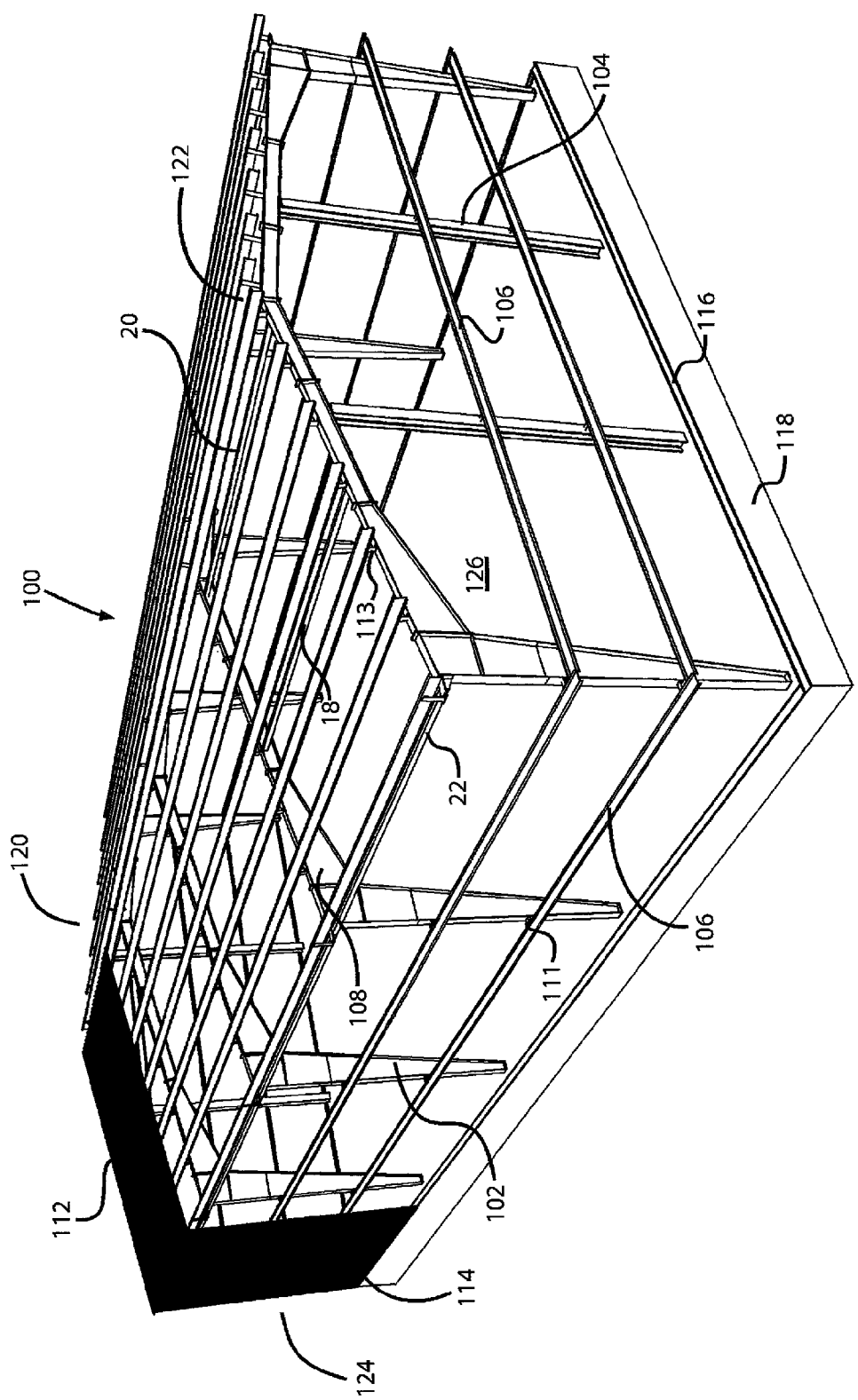
FIG. 1 is a perspective cutaway view of a typical metal building.
Figure 1A:
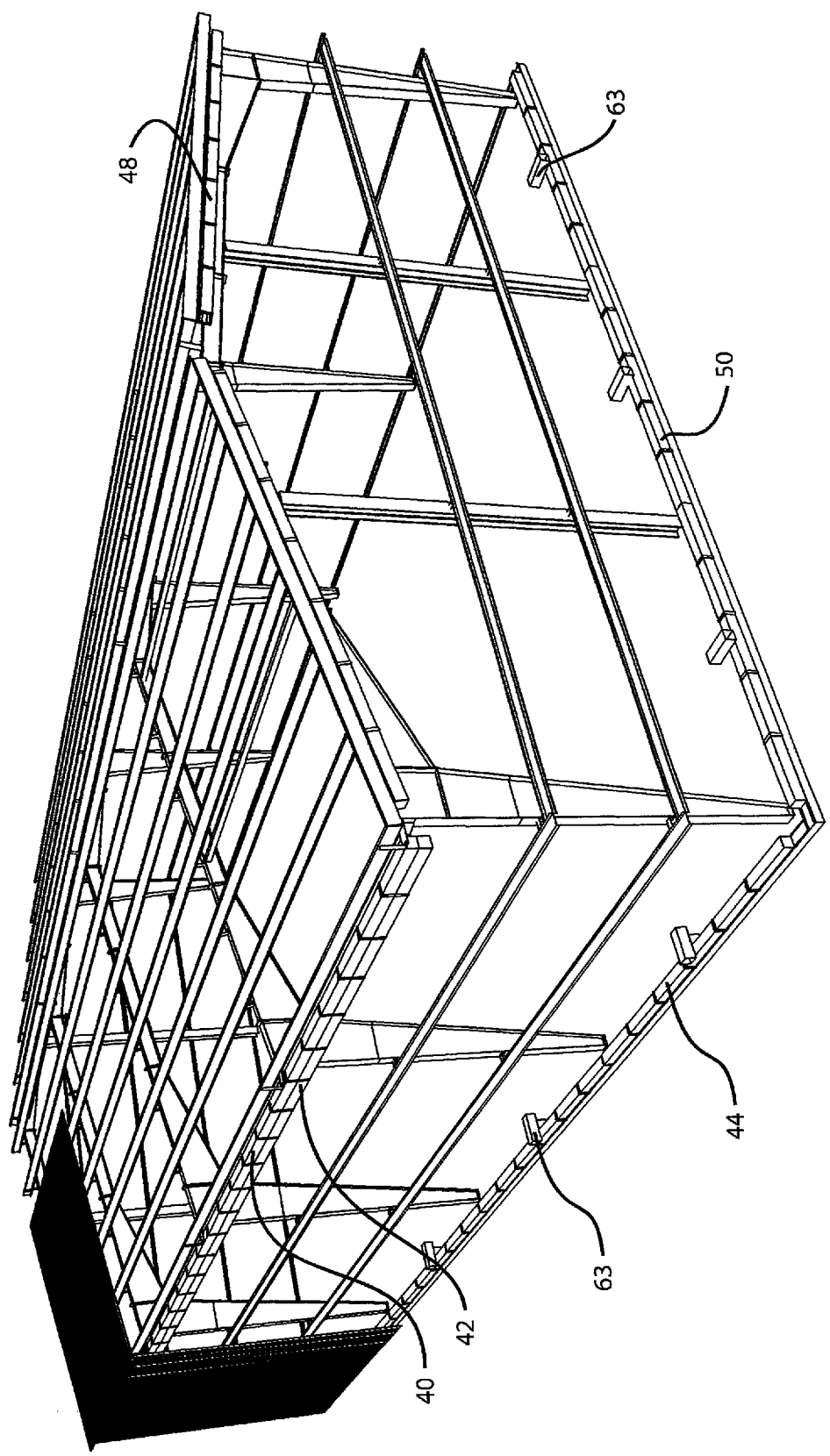
FIG. 1a is a perspective cutaway view of a typical metal building of this invention with a plurality of ducts installed.
Figure 2:
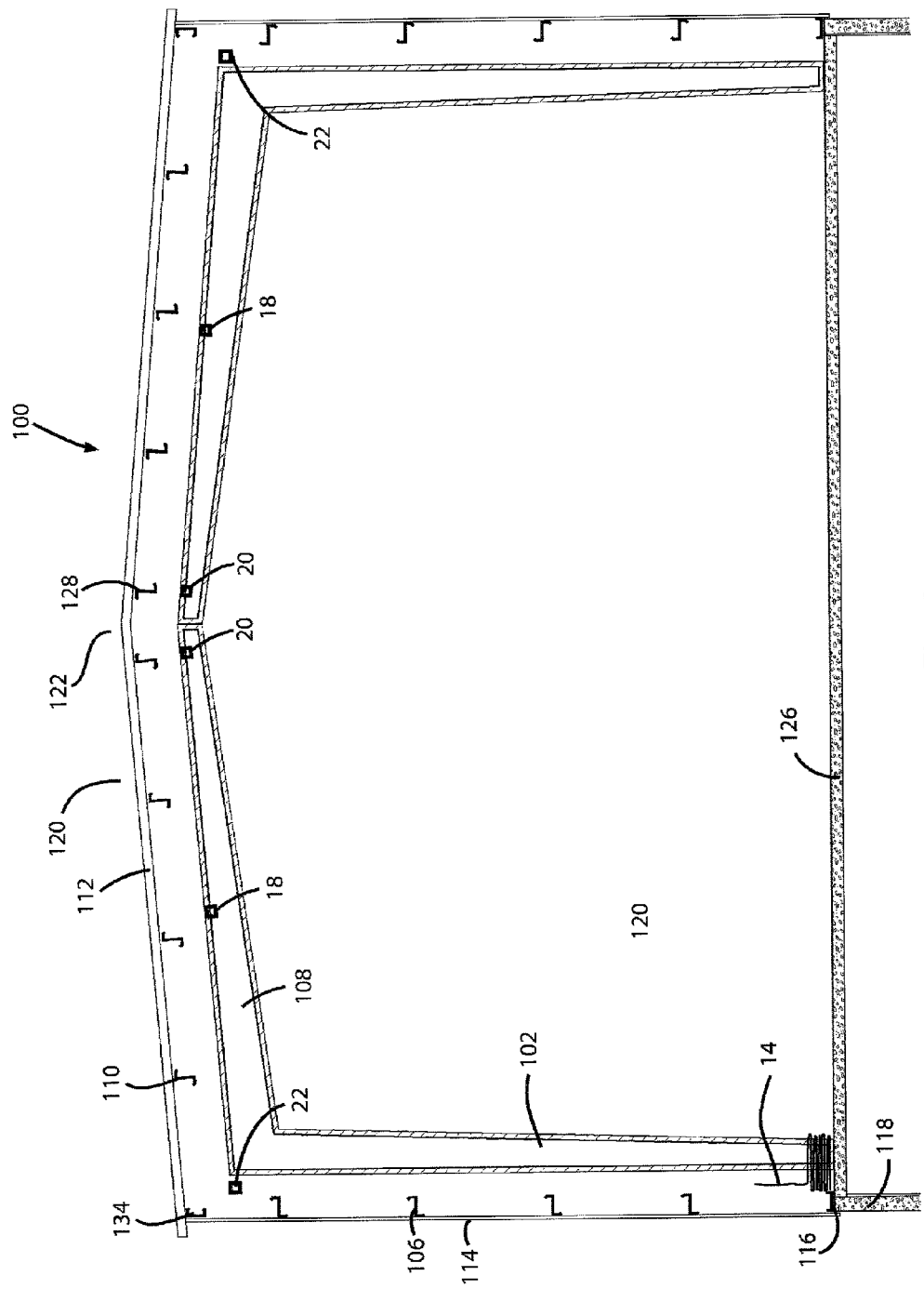
FIG. 2 is a cross sectional end view of a metal building, before installation of a tensioned ceiling or wall sheet in accordance with the present invention.
Figure 3:
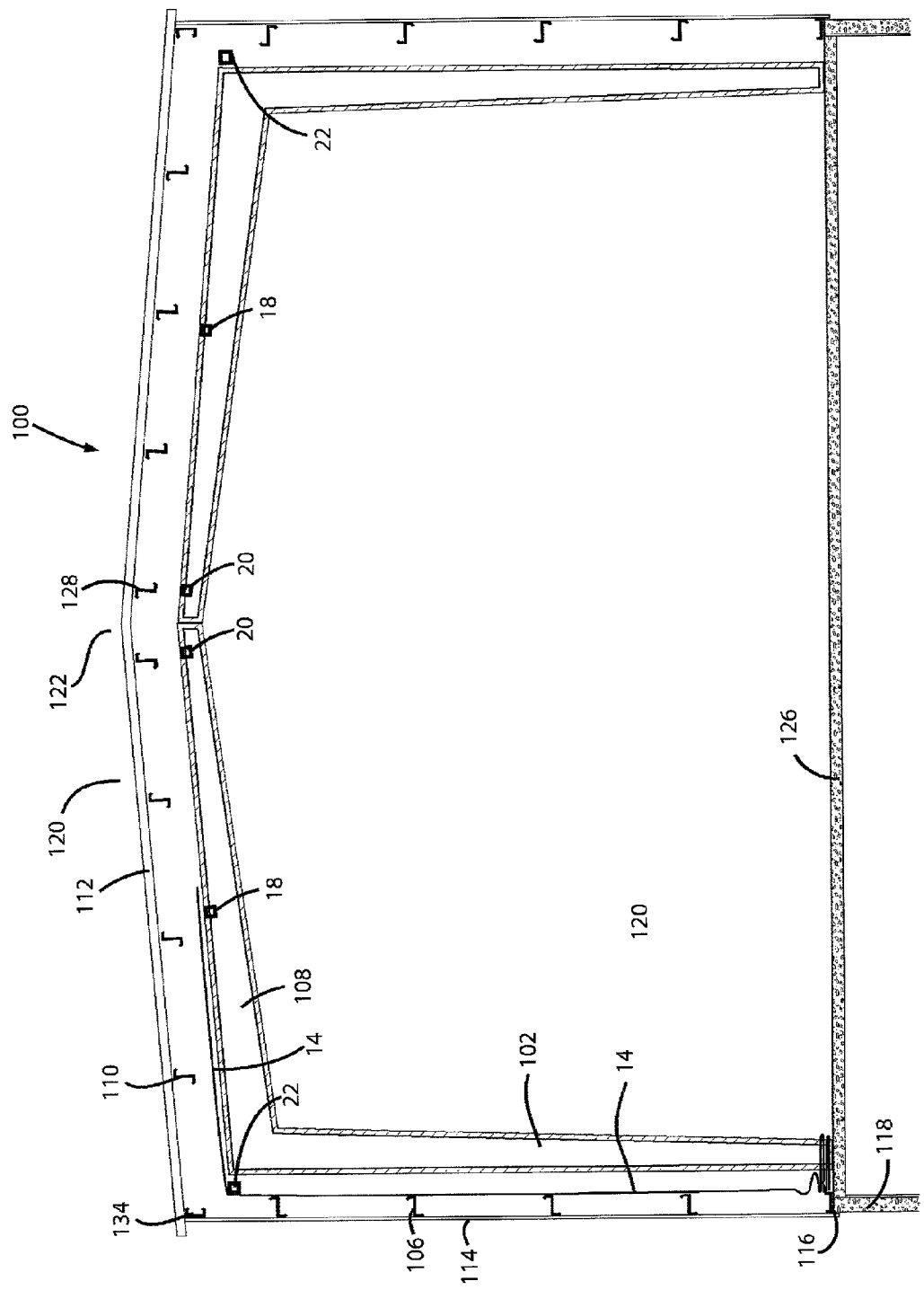
FIG. 3 is a cross sectional end view of a metal building, as a sheet material is partially installed over sheet material support struts in accordance with the present invention.
Figure 4:
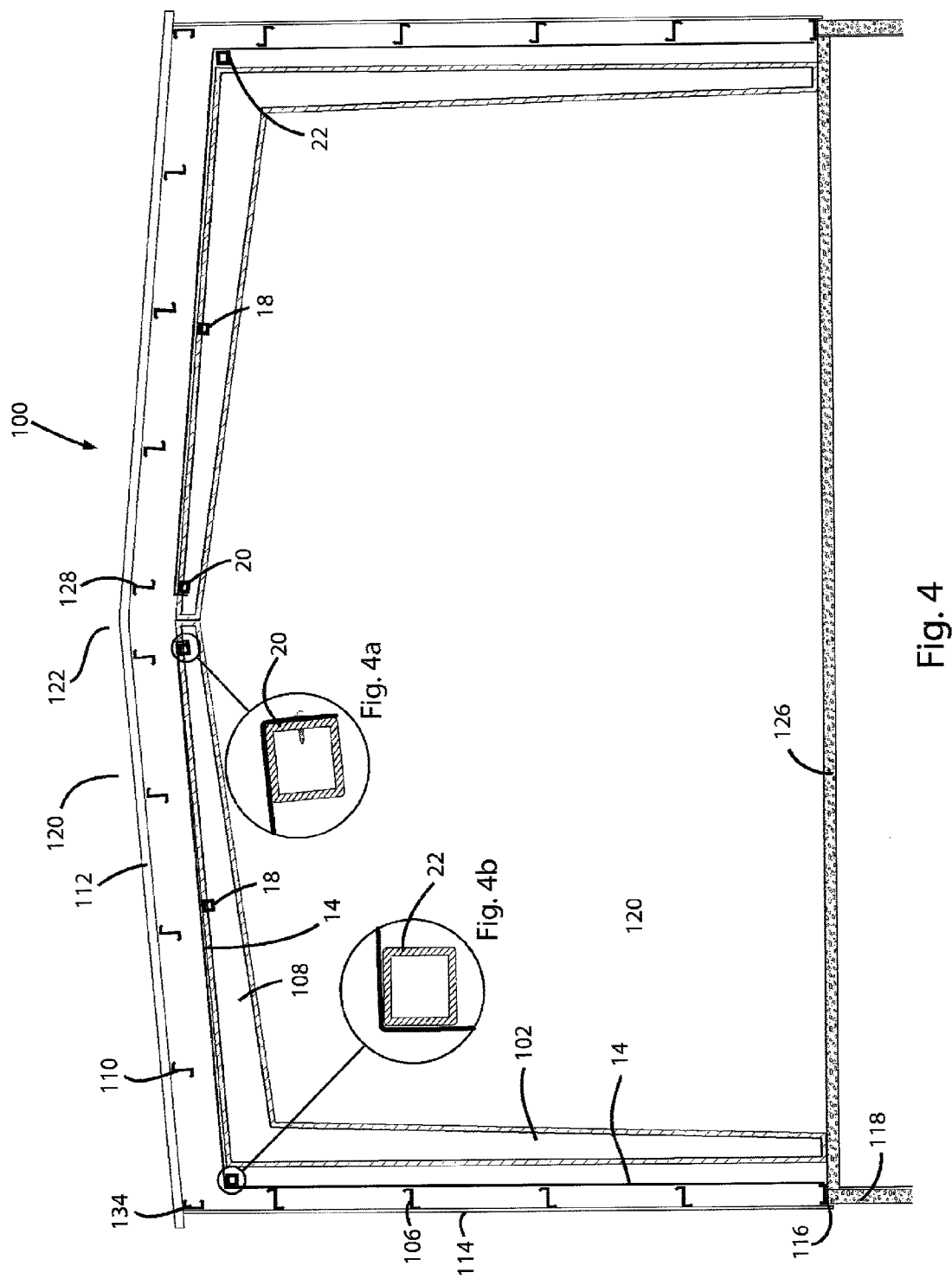
FIG. 4 is a cross sectional end view of a metal building, after installation of a sheet material when a sheet material is terminated at a ridge sheet material support strut in accordance with the present invention.
Figure 5:
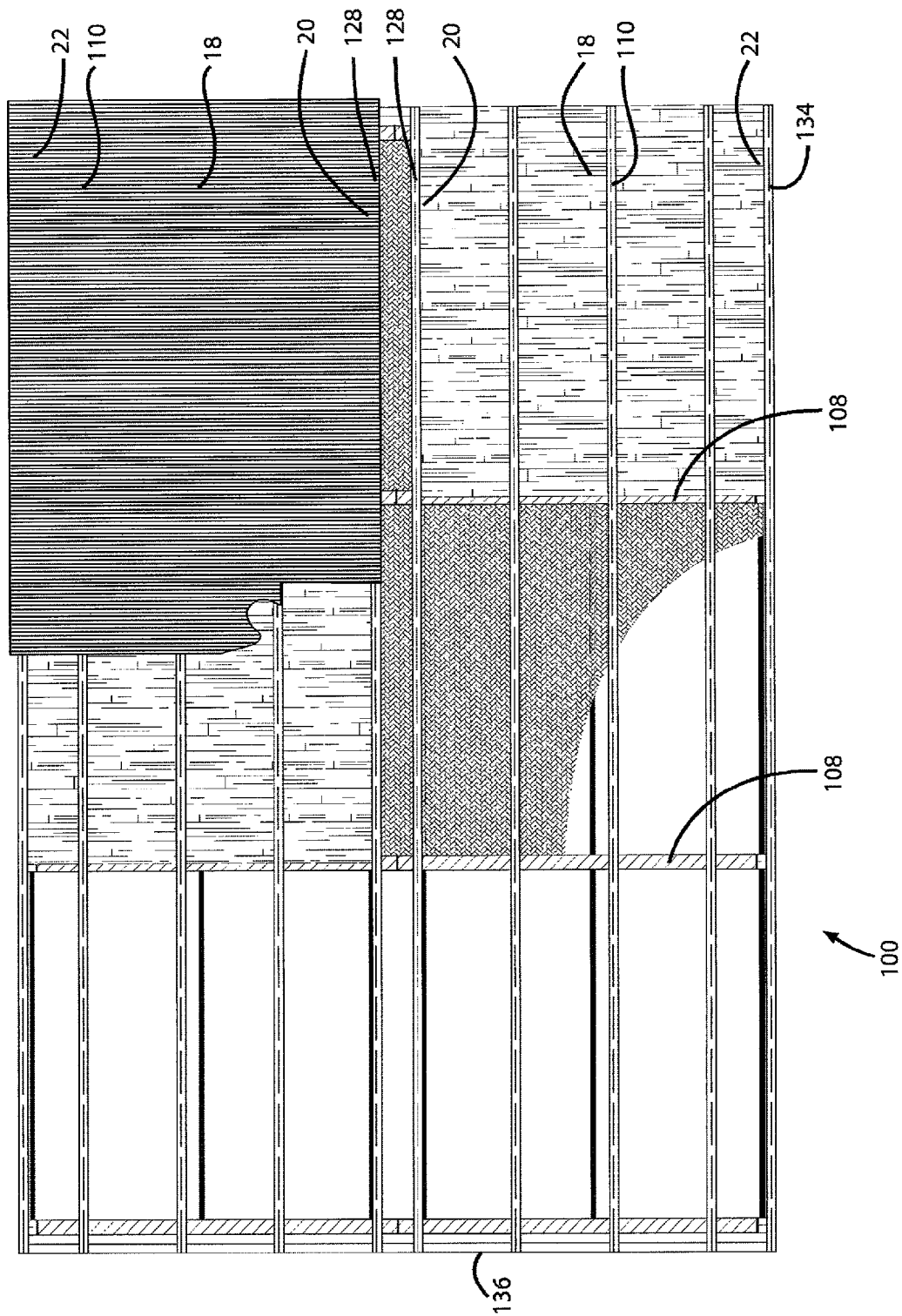
FIG. 5 is a top view of a metal building containing purlins and a ceiling sheet material support struts, prior to the installation of a ceiling sheet material, a thermal insulation layer and roof sheeting panels in accordance with the present invention.
Figure 6:
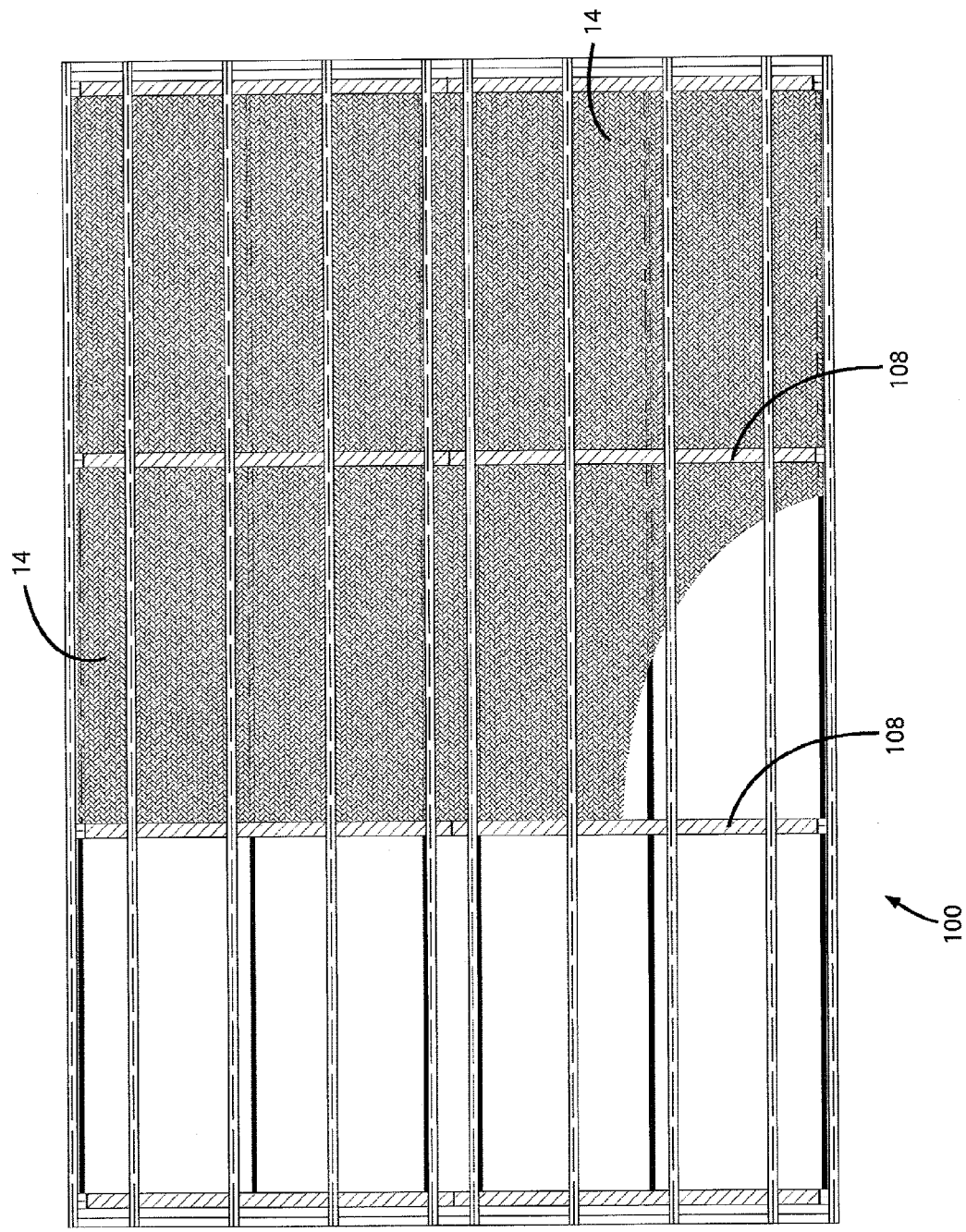
FIG. 6 is a cross-sectional top view of a metal building below purlins with at one ceiling sheet material installed and another in a cut-a-way view showing underlying ceiling support struts in accordance with the present invention.
Figure 7:
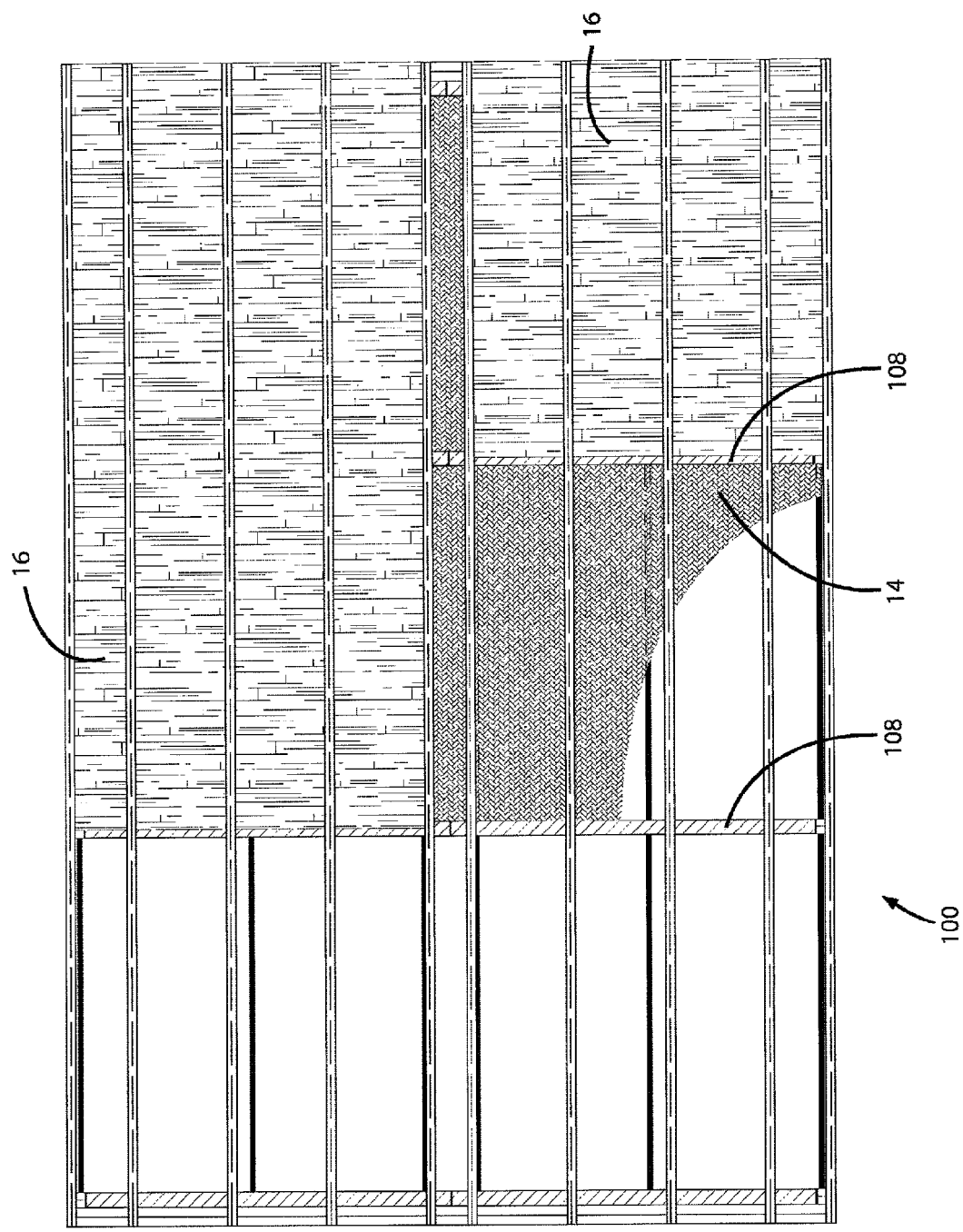
FIG. 7 is a cut-a-way top view of a metal building with a ceiling insulation layer installed on top of at least one ceiling sheet prior to the installation of any roof sheeting panels in accordance with the present invention.
Figure 8:
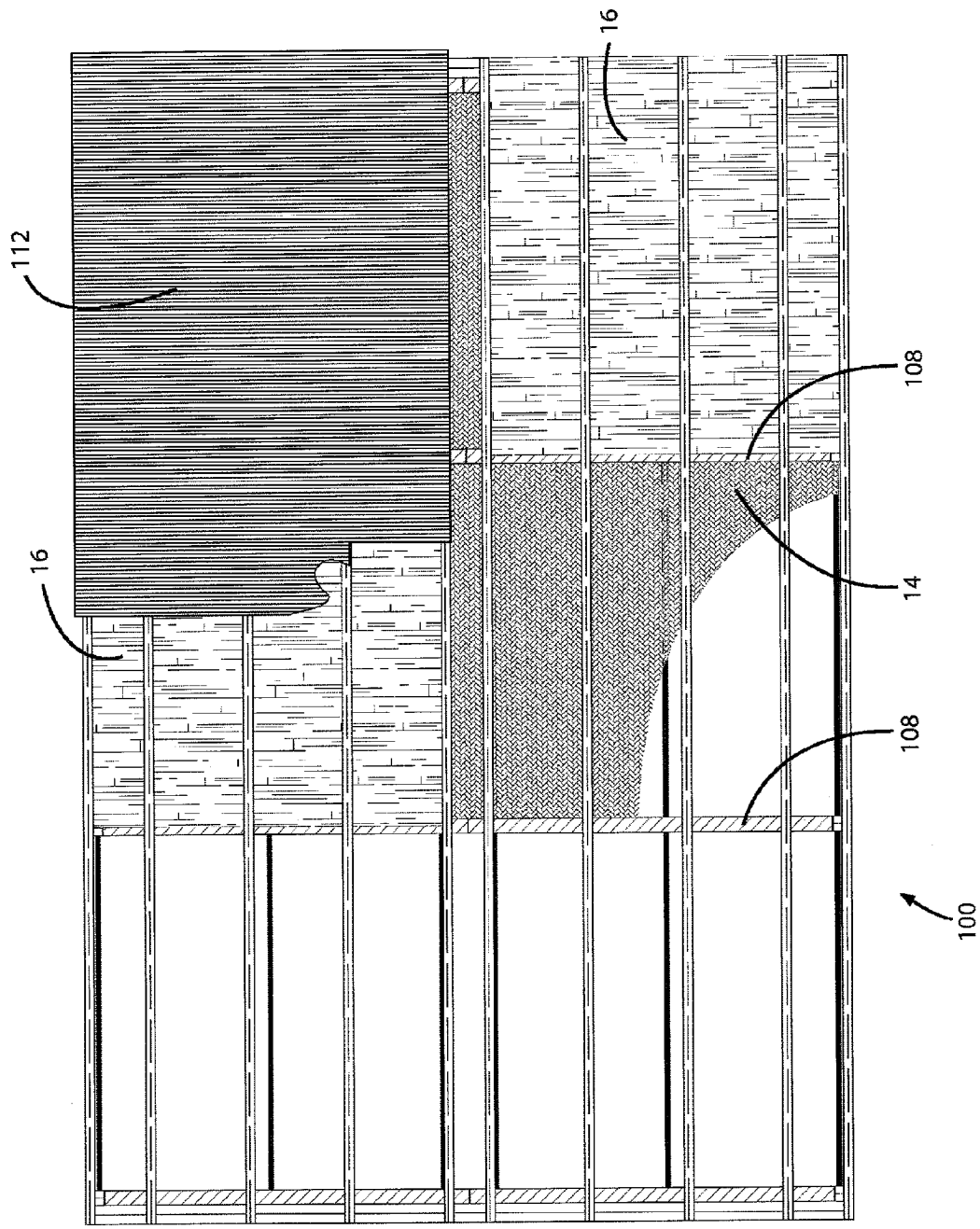
FIG. 8 is a cut-a-way top view of a metal building with a ceiling insulation layer installed on top of at least one ceiling sheet and a roof panel installed on top of a plurality of purlins, an air gap layer is formed between a ceiling insulation layer and a roof sheeting panel in accordance with the present invention.
Figure 10:
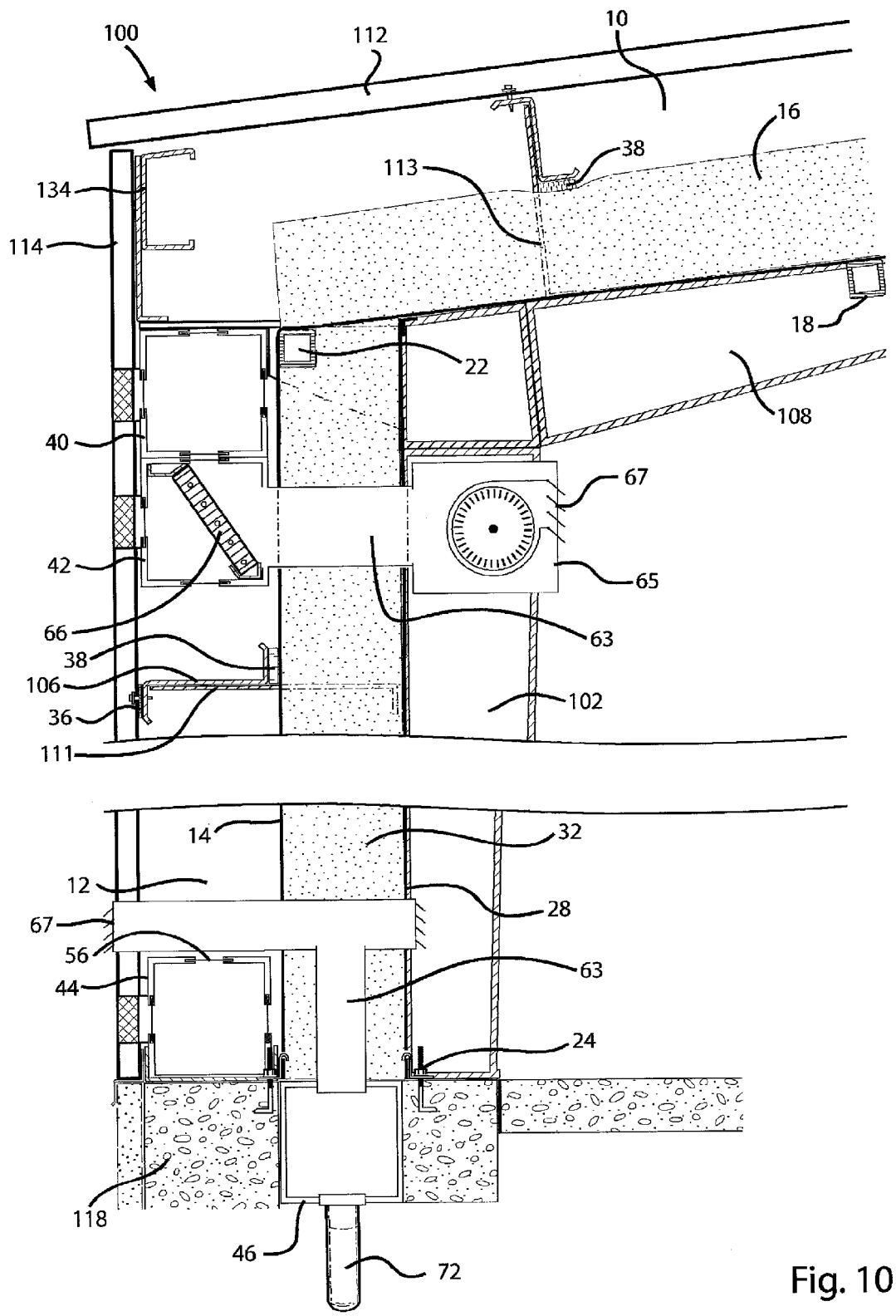
FIG. 10 is a partial cross sectional end view at a side wall column location of a metal building illustrating a side wall from a foundation and floor to the eave and roof of the building in accordance with the present invention.
Figure 11:
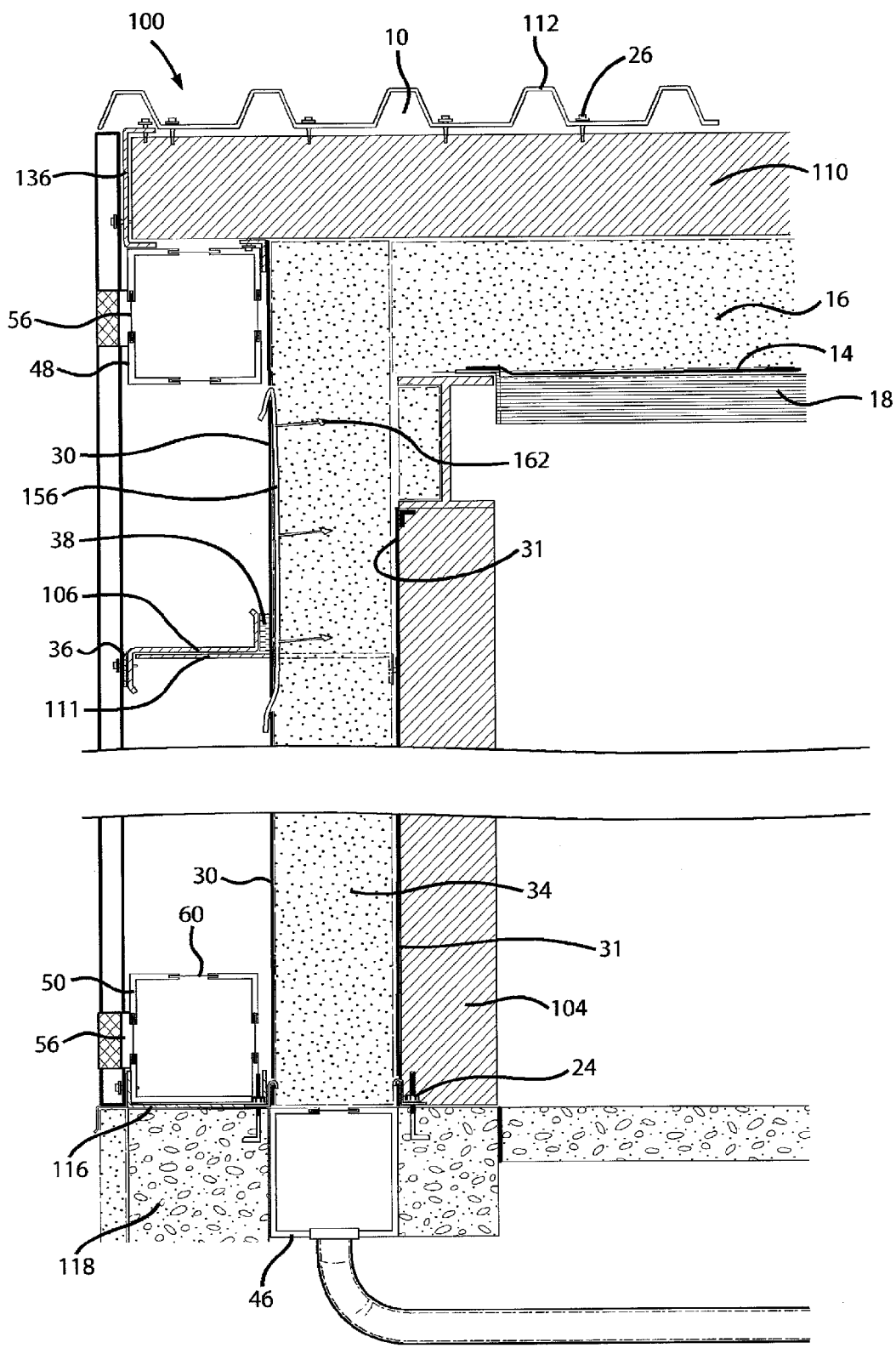
FIG. 11 is a partial cross sectional view of a metal building illustrating an end wall from foundation and floor to a gable end eave and roof of a building at the location of a ceiling sheet support strut in accordance with the present invention.

With reference now to the drawings, and particularly to FIGS. 1,1a,10,11 there is shown a cutaway perspective view of a solar heat pump building 100. With reference to FIGS. 10,11 the solar heat pump building 100 preferably includes a building 100, exterior sheeting panels 112, 114, a heat collection air gap layer 10, 12, air vent spacers 36, 38, a material insulation layer 32, 34 and a plurality of ducts. With reference to FIG. 1, the building is preferably the metal building 100, but other types of buildings may also be used. The metal building 100 includes a plurality of rafter columns 102, a plurality of end columns 104, a plurality of girts 106, a plurality of rafters 108, a plurality of purlins 110, a plurality roof sheeting panels 112, a plurality of wall sheeting panels 114 and a peripheral base channel 116. The plurality of rafter columns 102 and the plurality of end columns 104 are attached to the peripheral base foundation 118. The peripheral base channel 116 is attached to a foundation 118 to form a perimeter of the metal building 100. The plurality of girts 106 are retained between horizontally extended girt clips 111, off the exterior surfaces of the plurality of rafter columns 102 and end columns 104. The plurality of rafters 108 are attached to a top of the plurality of rafter columns 102. The plurality of purlins 110 are retained between vertically extended purlin clips 113 above the exterior faces the plurality of rafters 108.

Figure 16:
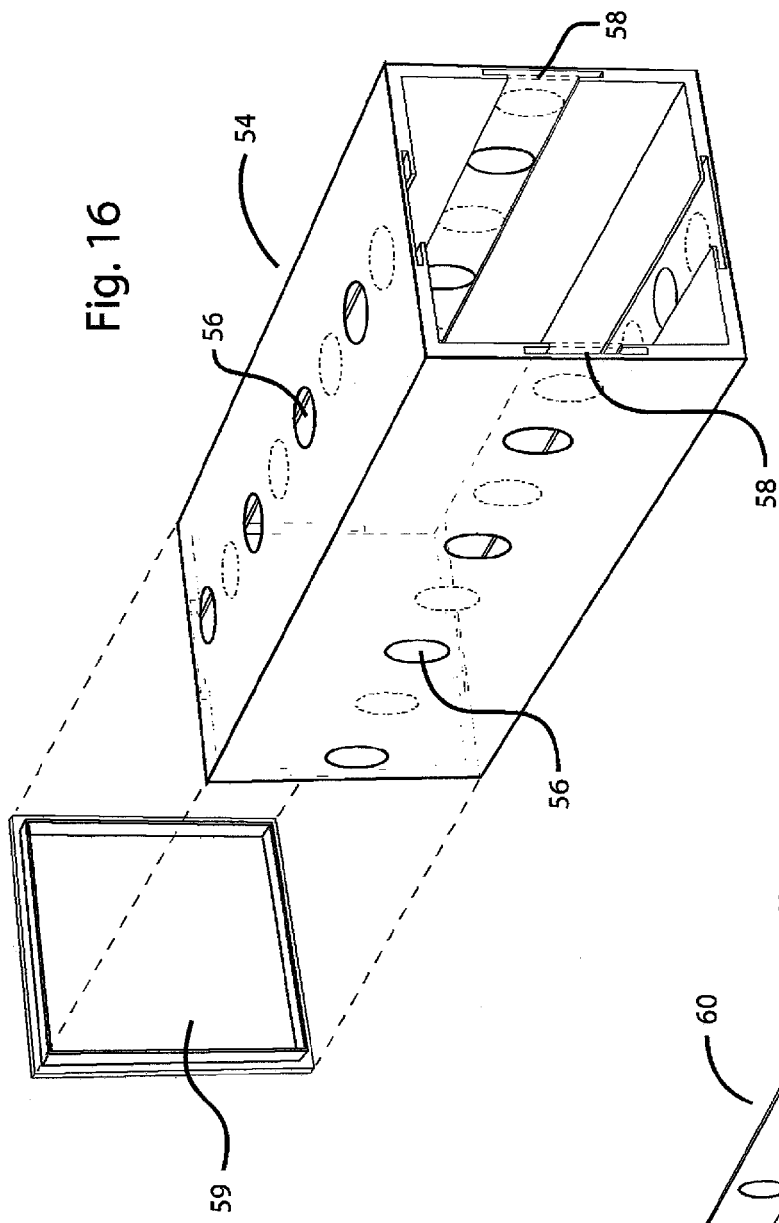
FIG. 16 is an exploded perspective view of a single duct module with an end cap, but without damper strips in accordance with the present invention.

With reference to FIGS. 10 and 16, the heat collecting air gap layers include a roof heat collecting ceiling air gap layer 10 and a wall heat collecting air gap layer 12, which communicate with each other on demand through duct damper holes 56 to increase the total heat collector surface area available to absorb solar heat. The solar heat from the east, west, south or north walls can be individually directed through ducts 40,42, 48 through damper holes 56 to the solar exposed roof 120, to melt snow and ice, thereby maximizing the total heat absorption surface area to achieve greatest volume and heat energy concentration.

With reference to FIGS. 2-8, the composite roof assembly preferably includes at least one ceiling sheet material 14, a ceiling material insulation layer 16, at least two intermediate ceiling support struts 18, at least two ridge ceiling support struts 20 and at least two eave inside corner ceiling support struts 22. Each intermediate ceiling support strut 18 and eave inside corner ceiling support strut 22 are attached between two adjacent rafters 108. Each ridge ceiling support strut 20 is attached to two adjacent rafters 108 adjacent a ridge 122 of the roof 120 and vertically aligned below the roof 120 ridge purlins 128. Each eave inside corner ceiling support strut 22 is attached in a corner between a roof 120 and a side wall 124 of the metal building 100.

One end of the ceiling sheet material 14 is inserted behind the eave inside corner ceiling support strut 20, above the intermediate ceiling support struts 18, above the ridge ceiling support strut 20 adjacent a ridge 122 of the roof 120 and securely attached to the nearest ridge ceiling support strut 20 with fasteners or the like. The other end of the sheet material 14 is attached to either a foundation 118 or a floor 126 of the metal building 100 with adhesive, a tensioning device 24 or any other suitable means.

With reference to FIGS. 10a-10h, a variety of tensioning devices include a turnbuckle tensioning device 202, a right angle take-up tensioning device 204, a hook and threaded rod tensioning device 206, a ratchet strap tensioning device 208, a turning shaft tensioning device 210, a single adjustable strut tensioning device 212, a bi-directional adjustable strut tensioning device 214 and a strap winch tensioning device 216.

Figure 12:
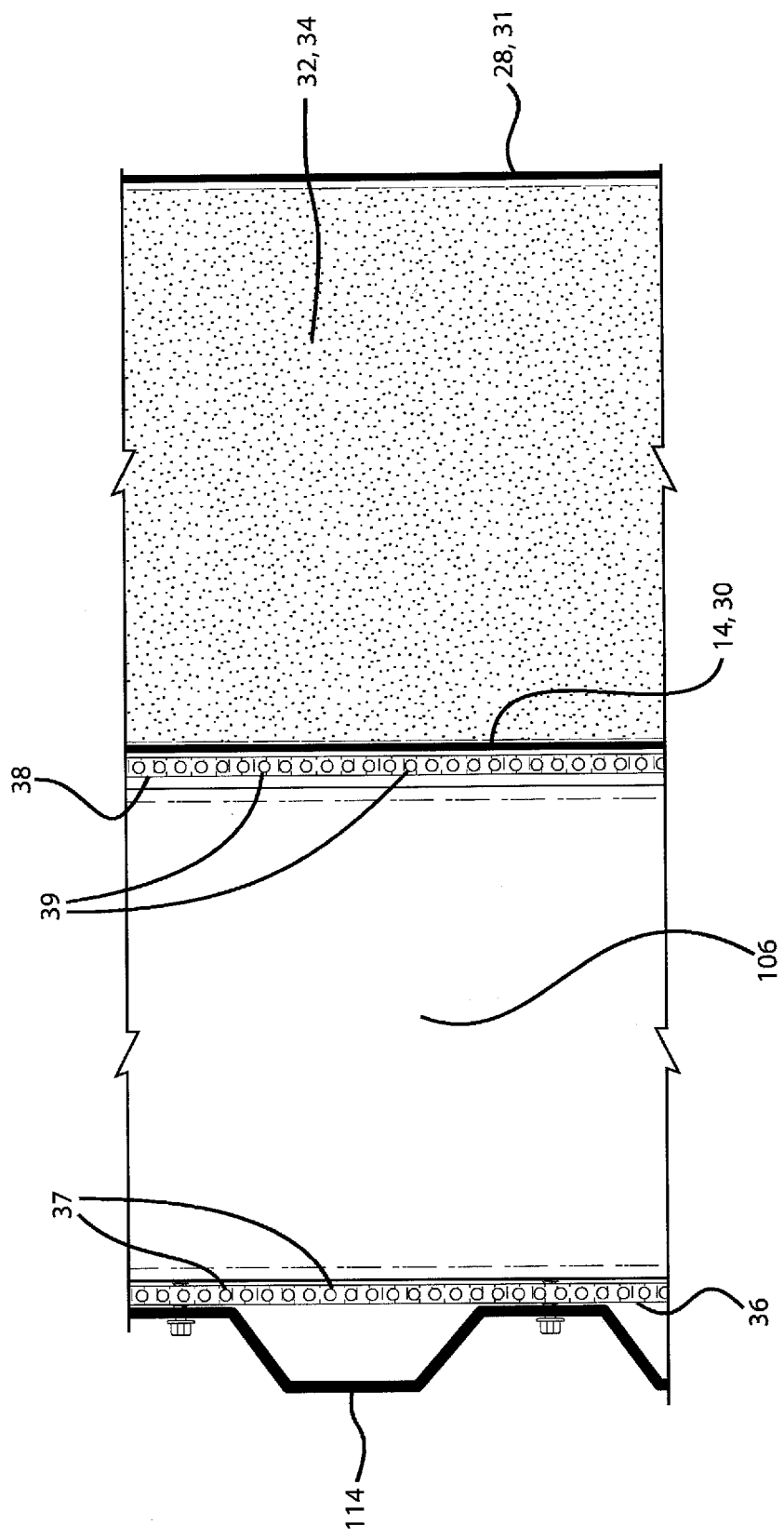
FIG. 12 is a top view looking into a side wall or an end wall of a metal building illustrating an air gap layer, a material insulation layer and a girt with interior and exterior flange mounted vent spacers in accordance with the present invention.
Figure 13:
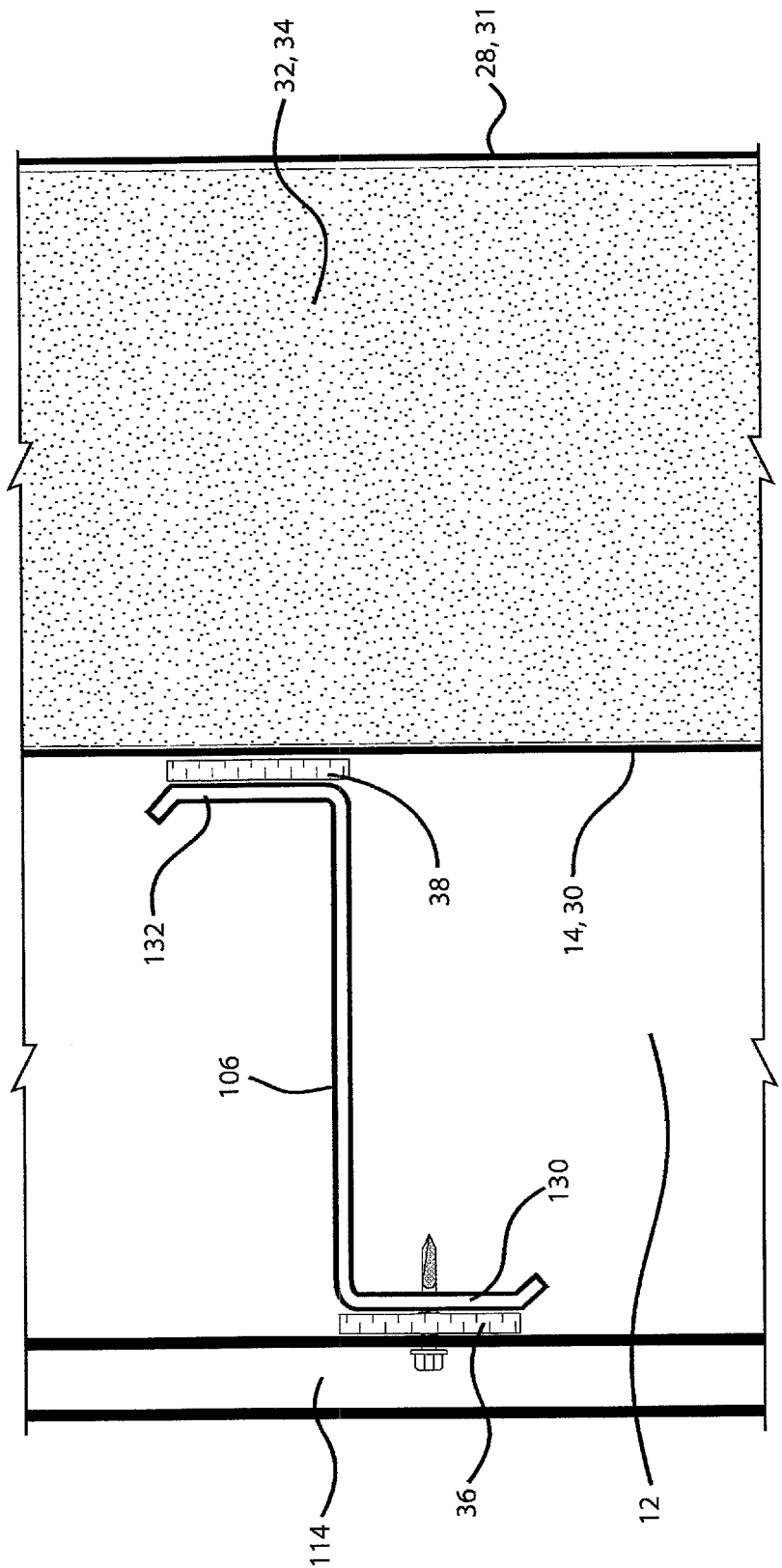
FIG. 13 is an end view looking into a side wall or an end wall of a metal building illustrating an air gap layer, a material insulation layer and a girt with interior and exterior flange mounted vent spacers in accordance with the present invention.
Figure 14:
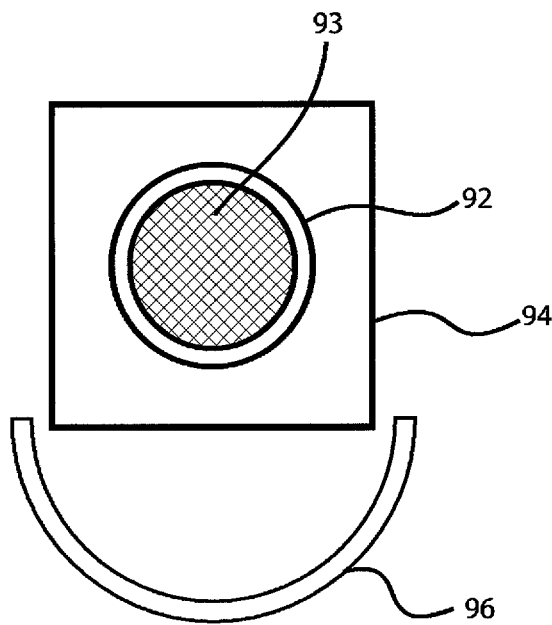
FIG. 14 is an enlarged cross sectional end view of a heat collecting dehumidifier pipe with square fins retained above a water collection trough in a ridge mounted multi-vent, which may also be used in an upper wall air gap layer or upper wall duct to collect heat and dehumidify the wall air gap air in accordance with the present invention.

Alternatively, one end of the sheet material 14 is secured to the foundation 118 or the floor 126 on one side of the metal building 100 and the other end of the sheet material 14 is inserted around the exterior side of the eave inside corner ceiling support strut 22, inserted over the intermediate ceiling support strut(s) 18, inserted over the two ridge ceiling support struts 20, inserted over the opposite side intermediate ceiling support strut(s) 18, inserted over the opposite side eave inside corner ceiling support strut 22 and finally secured with a tensioning device 24 or any other suitable means to the foundation 118 or floor 126 on an opposing side of the metal building 100. Significant tension is typically required to limit deflection when supporting the load of the material insulation layer without any intermediate fasteners and thermal bridging common to all known prior art. The ceiling insulation layer 16 is laid on the at least one ceiling sheet material 14 and includes an insulation thickness that extends upward to near the bottom of the plurality of purlins 110. Although not required, an air flow path is desired between the material insulation layer 16 and the bottom of the plurality of purlins 110 to allow cooler, more dense air to flow toward the eave purlin 134 to more efficiently complete the movement of the heat energy up over the purlins 110 to the ridge 122 and the cooler, more dense air is allowed to flow back down toward the eave purlin 134. Open web purlins and joist allow the heat energy, humidity and air to flow in all directions without an efficiency concern. FIGS. 12-13 show a plurality of inner vent spacers 38 that include air vent holes 39 which would be installed on the under side of the bottom flange 132 of the plurality of solid web purlin 106 to ensure an air circulation path from ridge to eave. The ceiling heat collecting air gap layer 10 is created between a top of the ceiling material insulation layer 16 and a bottom of the roof panel 112. Preferably the roof sheeting panels 112 are connected to the tops of the purlins 110 with a plurality of thermal conductive fasteners 26 to maximize thermal conduction from the plurality of thermally conductive roof sheeting panels 112 into the plurality of conductive, radiative roof purlins 110, 128, 134. With reference to FIG. 14, maximizing conduction will enhance the heat transfer, enhance the heat collection in the air gap layer 10, enhance the heat concentration at the highest point of the air gap layer 10 closest the ridge 122 and enhance overall efficiency of heat energy collection at the heat collection fins 94 of the heat transfer pipe 92 of the solar heat pump building 100.

Figure 18:
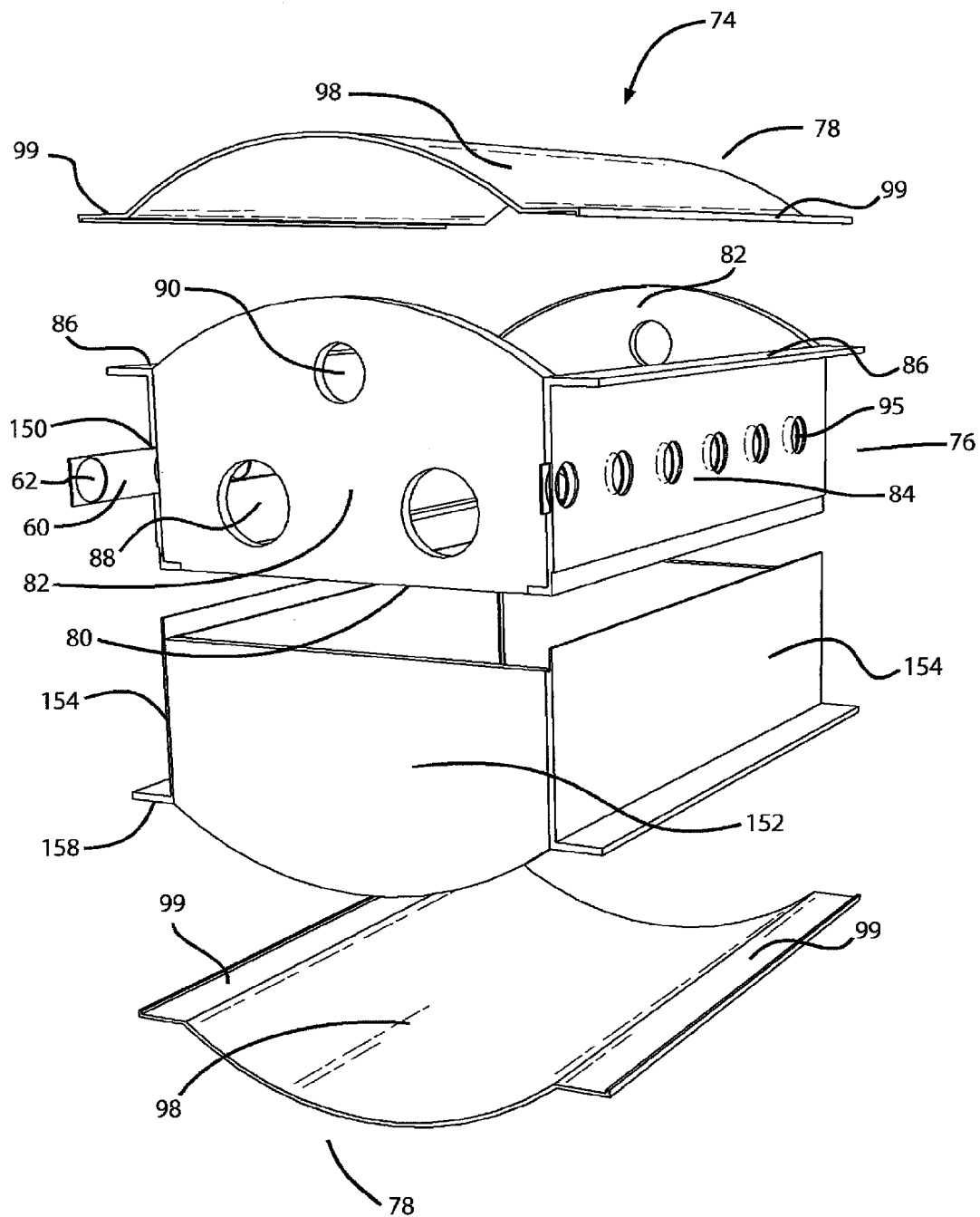
FIG. 18 is an exploded perspective view of a ridge mounted multi-vent, a similar multi-vent turned ninety degrees may be mounted in place of an upper wall duct in a sidewall or end wall to function for system inspection and wall daylighting purposes in accordance with the present invention.
Figure 19:
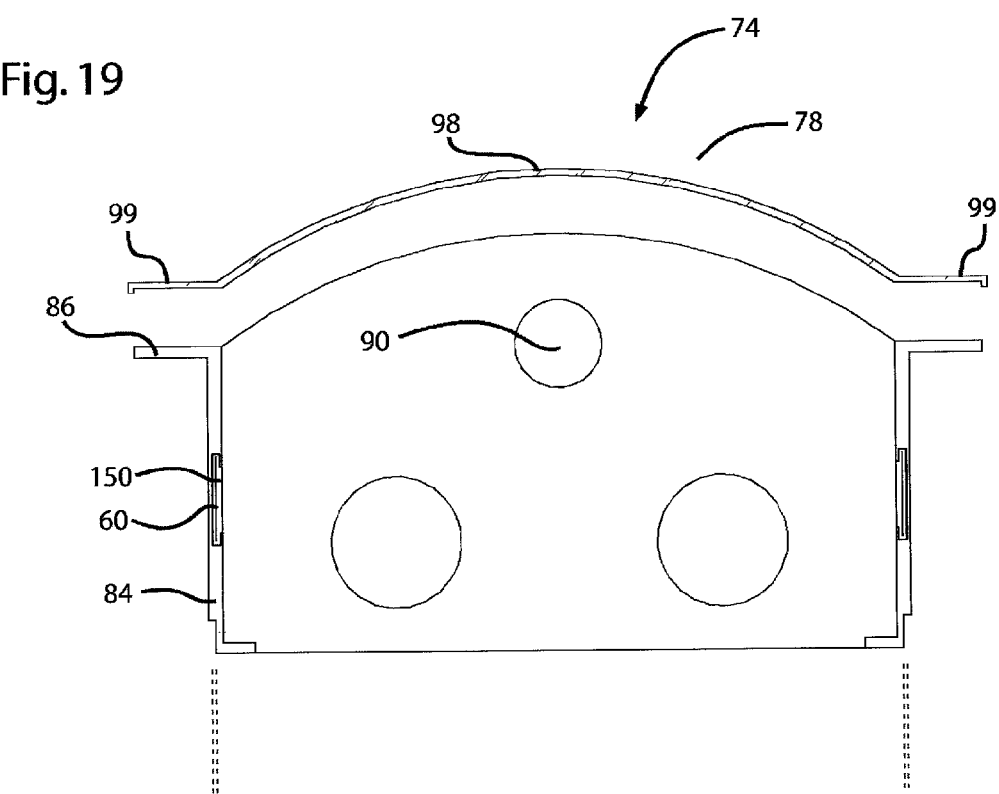
FIG. 19 is an end view of a box unit of a ridge mounted multi-vent with a damper slot formed in the opposing sides thereof to retain two operable damper strips in accordance with the present invention.
Figure 20:
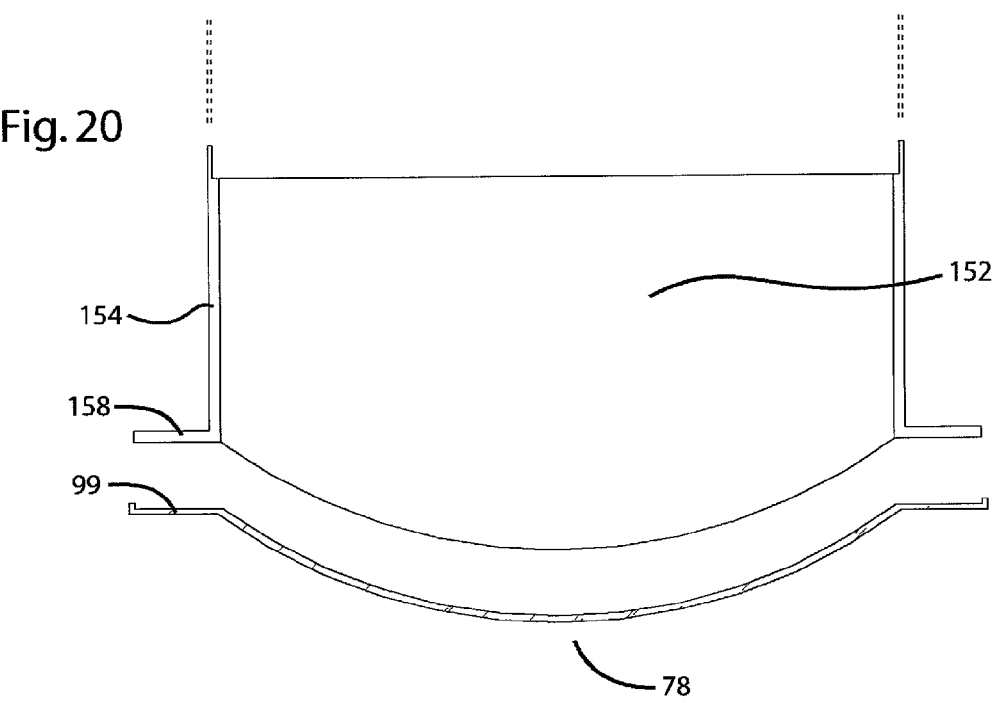
FIG. 20 is an end view of a box end panel extension of a ridge mounted multi-vent in accordance with the present invention.
Figure 21:
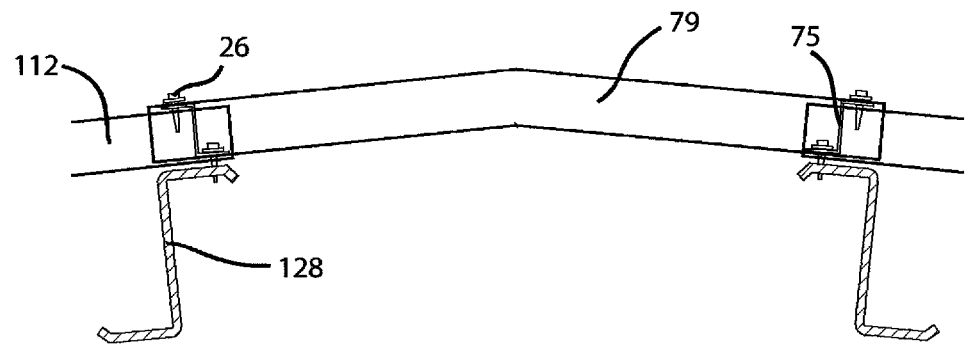
FIG. 21 is a cross-sectional end view of a typical metal building ridge cap made of a formed corrugated roof panel in a building ridge, which matches the corrugation configuration of roof panels.
Figure 22:
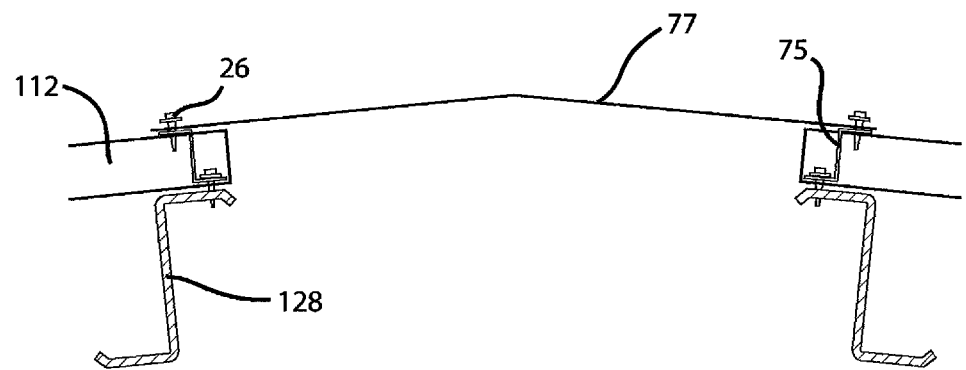
FIG. 22 is an alternative cross-section end view of a typical metal building ridge cap formed into two flat planes and two formed metal closures to fill in the corrugation profile of the roof sheeting panels, a closure installed on each side of a ridge, the ridge cap does not need to match the roof panel corrugation.
Figure 23:
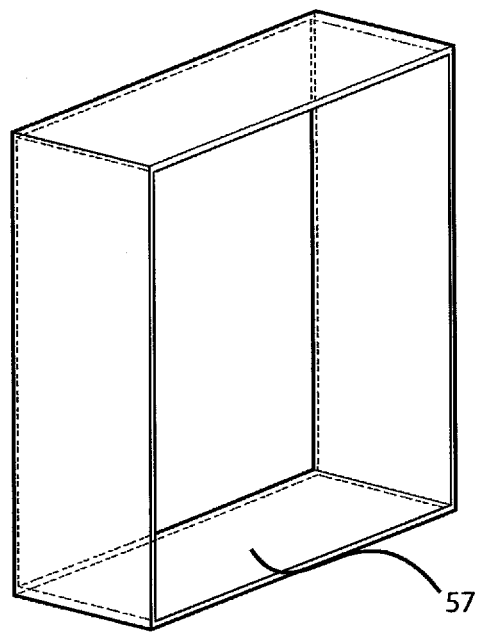
FIG. 23 is a perspective view of a modular duct connection coupling in accordance with the present invention.
Figure 24:
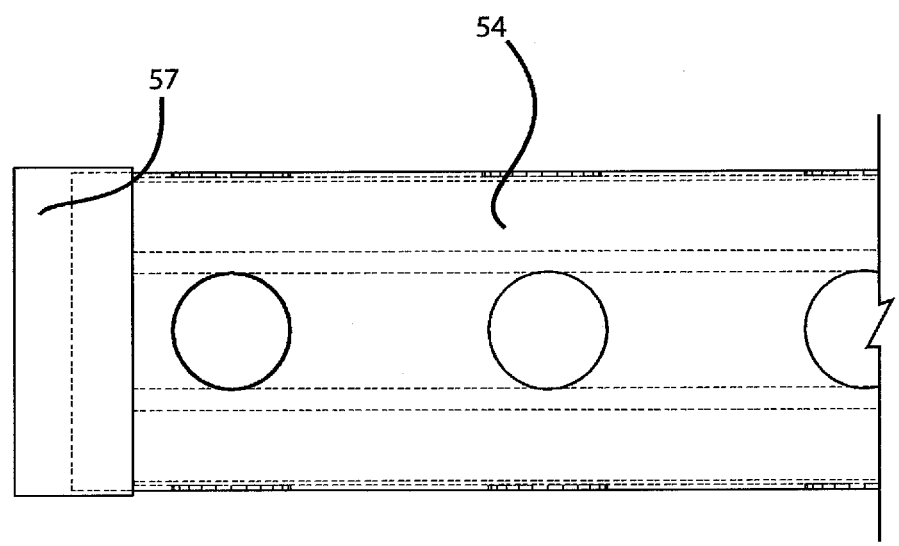
FIG. 24 is a side view of a duct module with the duct connect coupling installed on one end in accordance with the present invention.

FIGS. 18-20 illustrate a preferred alternative to a typical metal roof ridge cap 77, 79 of FIGS. 21-22. The ridge mounted multi-vent 74 extends through the ridge 122 of the roof 120 and preferably extends a length of the roof ridge 122. The ridge mounted multi-vent 74 is located between two ridge purlins 128 and between the two ridge ceiling support struts 20. FIG. 20 illustrates a plurality of multi-vent box side panel extensions 152 and a plurality of multi-vent box end panel extensions 154 which attach to the bottoms of the plurality of multi-vents modules 74 to fill the open space to the bottoms of the two ridge ceiling support struts 20.

With reference to FIGS. 12-13, each solar heat pump building 100 composite wall structure includes an exterior metal wall sheeting panel 114, an optional exterior girt mounted vent spacer 36, a girt 106 in the air gap 12, the interior mounted girt vent spacer 38, an exterior wall sheet material 30 which may typically be an extension of the ceiling air barrier sheet 14, or may be an independent exterior wall sheet material 30, a material insulation layer 32, 34, and an interior wall sheet material 28, 31.

Figure 25:
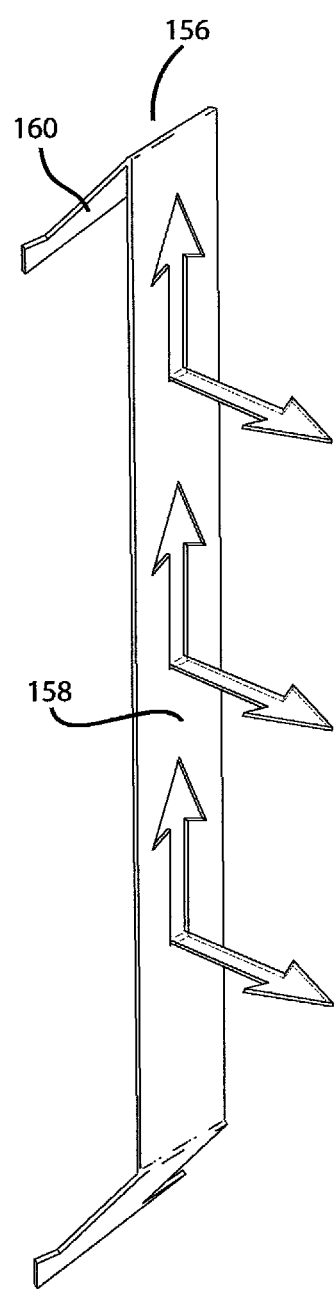
FIG. 25 is a perspective view of a bi-directional insulation hanger device designed to quickly impale and suspend from a wall sheet material on one side and to support an impaled insulation layer on the opposing side without any thermal bridging to a metal wall girts in accordance with the present invention.
Figure 26:
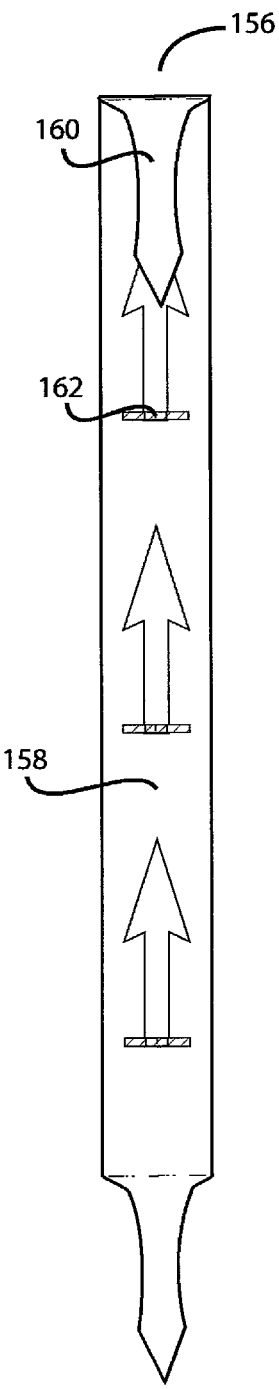
FIG. 26 is a rear view of an insulation hanger device in accordance with the present invention.

A plurality of optional girt exterior flange mounted vent spacers 36 include a plurality of through air flow openings 37, if desired to increase the heat flow area upward around the girts. The interior girt flange mounted vent spacers 38 are attached to an interior flange 132 of the girt 106. The interior girt spacers 38 include a plurality of through air flow openings 39, if desired to increase the heat flow area upward around the girts. An exterior surface of the wall sheet material 14 abuts the plurality of interior flange mounted girt spacers 38. With reference to FIGS. 25-26, a wall material insulation layer 32 is secured to a vertical portion of the wall sheet material 14 with a bi-directional impaling hanger 156 by first impaling the sheet material impaling arrows 160 through the sheet material and then impaling the insulation layer on the opposite insulation impaling arrows 162 with any suitable method or device. A top end of each side wall interior wall sheet material 28 is preferably attached to the ceiling sheet material 14 with adhesive, fasteners or other suitable attachment means, such that the exterior surface of wall sheet material 28 contacts an interior surface of the wall insulation layer 32 which is typically fiber glass blanket or batt insulation. A bottom end of each wall sheet material 28 is attached at its base with a tensioning device 24, adhesive, fasteners or any other suitable attachment method. A plurality of wall heat collecting air gap layers 12 are created between an interior facing surfaces of the exterior wall sheeting panels 114 and the exterior facing surfaces of the side wall sheet material layer 14 which are typically extensions of the ceiling sheet layer 14.

The outer end wall sheet material 30 abuts to the plurality of inner girt flange vent spacers 38. A top end of first installed exterior end wall sheet material 30 is preferably attached to the ceiling sheet material 14 with adhesive, fasteners or other suitable attachment means, but may alternatively be attached to the end wall rafter 108 or to end wall girts 106 as limited by accessibility of an individual application. A bottom end of each first installed, exterior end wall sheet material 30 is attached to the foundation 118 or floor 126 with the tensioning device 24, adhesive or any other suitable attachment device and method. Wall material insulation layers 32, 34 preferably are suspended from the interior surfaces of the first installed, exterior wall sheet materials 14, 30. FIGS. 10a-10h illustrate various styles of tensioning devices which may be used to apply tension to the ceiling or wall sheet material 28, 31. Wall material insulation layers 32, 34 preferably are suspended from the interior surfaces of the first installed, exterior wall sheet material 14, 30.

The plurality of bidirectional impaling suspension hangers 156 are used to suspend the wall material insulation layers 32,34. The exterior facing impaling arrows 160 impale the outer wall sheet for support. The insulation layer 32,34 is impaled on the opposing impaling arrows 162 to support the insulation in suspension without any thermal bridging to the exterior wall girts and panels. A top end of each second installed, interior wall sheet material 28, 31 is preferably attached to the ceiling sheet 14 with adhesive, fasteners or other suitable attachment means, such that its exterior surface contacts an interior surface of the wall insulation layer 32,34. A bottom end of each second installed, interior wall sheet material 28, 31 is attached at its base with a tensioning device 24 or any other suitable attachment device and method. The end wall heat collecting air gap layer 12 is created between an interior facing surface of the exterior end wall sheeting panels 114 and the exterior facing surface of the first installed, exterior end wall sheet material 30. The side wall heat collecting air gap layer 12 is created between an interior facing surface of the exterior wall sheeting panels 114 and the exterior facing surface of the first installed, exterior side wall sheet material 14,30.

Figure 17:
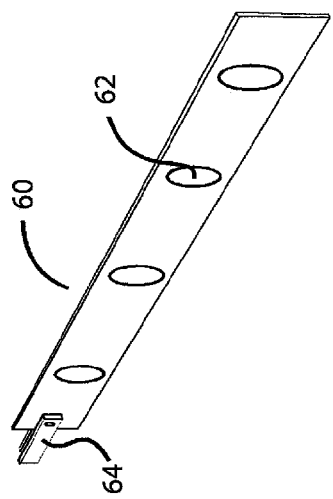
FIG. 17 is a perspective view of a damper strip for insertion into a damper strip slot of a duct module or multi-vent module in accordance with the present invention.

With reference to FIGS. 1a, 10-11, 16-17 and 23-24 the plurality of ducts include sidewall ducts and end wall ducts. The ducts are joined in series with a plurality of connection couplings 57. The plurality of sidewall ducts 40,42,44 generally have a horizontal orientation. The plurality of sidewall ducts preferably include two side wall eave ducts 40, two sidewall upper wall ducts 42, two sidewall base ducts 44 and two side wall subterranean air tubing ducts 46. The side wall eave ducts 40 provide an independent air flow path from the exterior air to the roof air gap layer. The upper side wall air flow duct provides and independent air flow path which communicates with the exterior air. The plurality of end wall ducts include upper wall ducts 48 with an orientation generally matching the roof slope along the top of the end wall air gap layer 12. The plurality of end wall base ducts 50 have a horizontal orientation along the base of the air gap layer 12. The plurality of end wall ducts preferably include two upper wall ducts 48 and two end wall base ducts 50. Each duct 40-50 is preferably fabricated from an extruded rectangular (preferably square) tube 54 illustrated in FIG. 16. The tube 54 preferably includes a plurality of air flow holes 56 formed through the sides thereof. With reference to FIG. 17, a damper strip slot 58 is formed in all four sides of the tube 54 to receive a damper strip 60. The damper strip 60 includes a plurality of holes 62, which may be aligned with the plurality of air flow holes 56 to allow air flow into the tube 54 or prevent air flow into the tube 54. Any suitable duct actuation device 64 may be used to slide the damper strip 60 in the damperstrip slot 58.

Each sidewall eave roof duct 40 is located below a lengthwise eave purlin 134. The eave roof duct 40 may be used to replace the eave purlin 134 and provide its intended function of ducting. Each end wall upper wall duct 48 is located below an end wall eave channel 136. The side wall, end wall, and subterranean ducts 40, 42, 44, 46, 48, 50 are capable of receiving outside air through either its air flow holes or through a branch duct. Typically there would be an operable damper strip 60 or louver 67 to open or close the air flow holes 56 or branch ducts 63 to air flows. The side wall upper wall duct 42 is located below the sidewall eave roof ducts 40.

Figure 15:
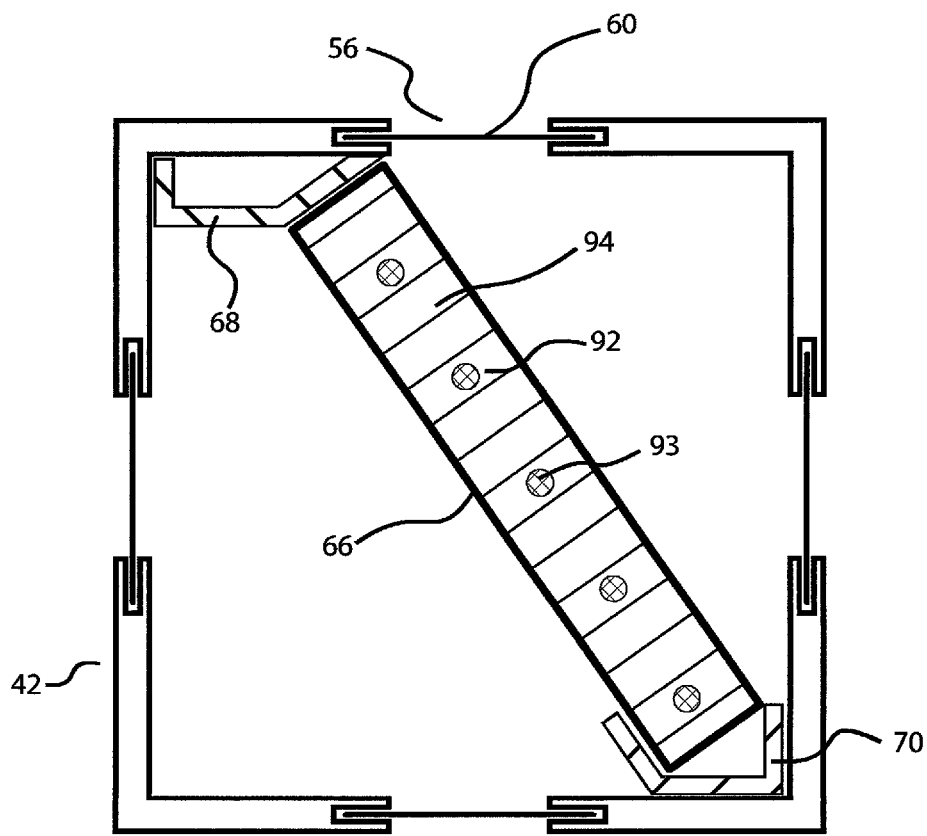
FIG. 15 is an enlarged cross sectional end view of a heat collection coil/dehumidifier retained above a water collection trough in a wall duct or a multi-vent in accordance with the present invention.

With reference to FIG. 15, a heat collection coil/dehumidifier 66 is preferably retained inside the sidewall upper wall air gap layer 12 or inside the upper wall ducts 42 at this same general location. An coil bracket 68 is secured to one edge of the side wall heat collection/dehumidifier coil 66 and a lower mounting bracket 70 is secured to the other edge of the heat collection/dehumidifier coil 66. With reference to FIG. 10, a blower 65 may be used to transfer heat and air from the wall heat collection air gap layer 12 to an interior space of the metal building 100. The side wall base ducts 44 and the end wall base duct 50 are located adjacent the wall panel 114 and above the floor 126. Ends of the side wall ducts 40, 42, 44 and ends of the end wall ducts 48, 50 are preferably closed with a duct end cap 59 of FIG. 16. The base ducts 44, 50 may be used to replace a base support channel (not shown) and provide their intended function of base ducting 44, 50.

Figure 9:
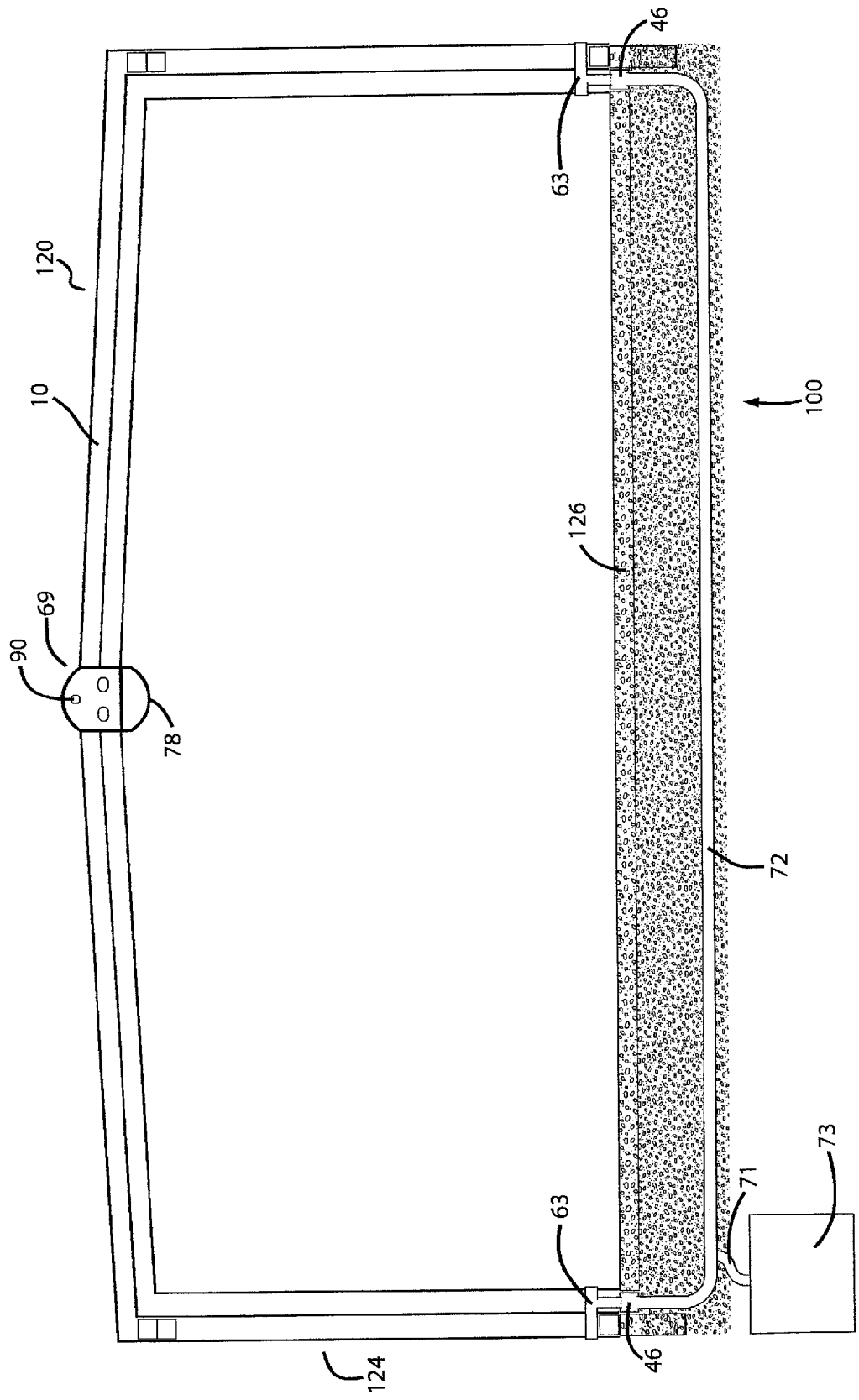
FIG. 9 is a cross sectional end view of a metal building with subterranean air conditioning ducts and tubing installed below a floor with a condensate drain pipe and water collection reservoir in accordance with the present invention.

With reference to FIG. 9, the two opposing side wall subterranean air ducts 46 are located at a base perimeter of the metal building 100, at floor level and which extends the side wall length of the metal building 100. One side wall subterranean air duct 46 communicates with the interior air space of the metal building 100 through at least one branch duct 63 or a plurality of tube 54 air flow holes 56. The opposing side wall subterranean duct communicates with the exterior air through at least one opposing branch duct 63 to the exterior air. A plurality of subterranean tubing 72 is located below the floor 126 of the building at a depth of about 6 to 8 feet, which run parallel to each other in the earth with the opposing subterranean tubing 72 ends connected to the two opposing subterranean ducts 46. Air flowed through the subterranean ducts 46 flows through the subterranean tubing 72 under the building floor 126 will be cooled by a reduced temperature of the earth in contact with the subterranean tubing 72. One end of the plurality of subterranean tubing 72 is connected to one of the two lengthwise subterranean air tubing ducts 46 and the other end of the plurality of foundation tubing 72 is connected to a second of the two lengthwise subterranean air tubing ducts 46.

It is preferable that the plurality of foundation tubing 72 be oriented either parallel to the end walls of the building or parallel to the side walls of the building. It is preferred that the plurality of subterranean tubing 72 be connected to either the opposing sidewall subterranean ducts 46 or to opposing end wall subterranean tubing ducts (not shown). It is possible to use more than one subterranean duct and tubing system under the floor 126 of the building 100 to condition additional volumes of ventilation air flowing through them. The subterranean tubes 72 should be sloped to a low point and connected to a liquid water drain pipe 71 with connects to a liquid water reservoir 73 from which the condensation water can be stored and recycled for other uses.

With reference to FIGS. 9, 18-20, the ridge mounted multi-vent 69 includes a plurality of vent modules 74 attached to each other end to end in series. The plurality of vent modules 74 are secured in series to each other with bolts or any suitable attachment device or method. Each vent module 74 includes a box unit 76 and a cover 78. The box unit 76 includes a vent base 80, two end walls 82, two side walls 84 and two box side flanges 86. The two end walls 82 extend upward from opposing ends of the vent base 80 and two side walls 84 extend upward from opposing sides of the vent base 80. A single flange 86 extends outward from a top of each box side wall 84. At least one air opening 88 may be formed through each end wall 82 to allow the flow of air between modules 74. With reference to FIG. 14, a heat transfer pipe hole 90 may also be formed through each end wall 82 to receive a heat transfer pipe 92. A plurality of heat fins 94 are attached along a length of the heat collecting pipe 92. A trough 96 is placed under the heat transfer pipe 92 to catch and channel condensation to a drain (not shown) along its length.

The cover 78 includes a cover portion 98 and a pair of cover side flanges 99 disposed on opposing side edges thereof. The cover portion 98 preferably includes a curved cross section. The cover side flange 99 extends from each side of the cover portion 98. A first sealing material (not shown) may be placed between the cover side flanges 99 and the box side flanges 86. A second sealing material (not shown) may be placed between the cover portion ends 98 and the box end wall 82 top edges. The cover 78 is preferably fabricated from a material, which is light collecting, light diffusing or opaque. A damper slot 150 may be formed into each side wall 84 to slidably retain the damper strip 60. A plurality of air flow holes are formed through the side walls 84 in the damper slot 150. The damper strip 60 of FIG. 17 may be shifted in the damper slot 150 with an actuation device to allow air to flow through air flow holes 62 and 95. With reference to FIGS. 21-22, the covers 78 of the plurality of vent modules 74 are secured through the flanges to ridge roof sheeting panel termination closure 75 or to the roof ridge purlin 128 structures with fasteners 26 or any suitable attachment device or method.

With Reference to FIGS. 18-20, the box unit 76 may have two end wall extension panels 152 which attach to base of the end walls 82, and two side wall extension panels 154 which attach to the base of the side wall panels 84. These extension panels fill any gap between the ridge support struts 20 and the base 80 of the multi-vent box unit side walls 84 and end walls 82. A cover 78 with two opposing side flanges 99 may be attached to the side wall extensions from the interior side.

While particular embodiments of the invention have been shown and described, it will be obvious to those skilled in the art that changes and modifications may be made without departing from the invention in its broader aspects, and therefore, the aim 1n the appended claims is to cover all such changes and modifications as fall within the true spirit and scope of the invention.

I claim:

1. A solar heat pump building, comprising:
   two side structural walls and two end structural walls extending upward from a floor, each of the structural walls include at least one of a plurality of thermally conductive girts and thermally conductive joists, a thermally conductive sheet is attached to at least one of the plurality of thermally conductive girts and the thermally conductive joists with a plurality of thermally conductive fasteners;

a roof is disposed on top of the two side structural walls and two end structural walls, the roof includes at least one of a plurality of thermally conductive roof purlins and thermally conductive joist members, a thermally conductive roof sheeting is attached to at least one of the plurality of thermally conductive roof purlins and thermally conductive joist members;

a wall insulation layer is disposed along an interior plane of at least one of the four structural walls to create a substantially uniform thickness wall air gap substantially a depth of the plurality of thermally conductive girts, said wall air gap is isolated from both outside air and from air inside a conditioned space in the building, wherein air is capable of circulating through said wall air gaps from substantially the floor to the roof;

a heat collection coil and dehumidifier is located inside the roof; and a roof insulation layer is located supported below an interior plane of the roof to create a roof air gap substantially a depth of the plurality of thermally conductive roof purlins, wherein heated air is capable of circulating through said roof air gap from at least one of the four structural walls up a slope of an underside of the thermally conductive roof sheeting to a higher point of the roof where heat is removed from the air by said heat collection coil and dehumidifier, said heat collection coil and dehumidifier causing dense cooled air to flow downward along a lower slope of the roof air gap toward an eave to complete circulation.

2. The solar heat pump building of claim 1, further comprising:

at least one damper is located within one of said wall air gaps, and said roof air gap, said at least one damper communicates with said wall air gaps in the structural walls and said roof air gap, wherein air in one of the structural walls is transferred to said roof air gap by manipulating said at least one damper.

3. The solar heat pump building of claim 1, further comprising:

said heat collection coil and dehumidifier are retained inside said roof air gap.

4. A solar heat pump building of claim 1, further comprising:

a multi-vent is located in a ridge of the roof, said multi-vent includes a plurality of vent modules, at least one of said plurality of vent modules includes a box unit and a cover.

5. The solar heat pump building of claim 4, further comprising:

a heat collection coil and dehumidifier are retained inside said multi-vent.

6. The solar heat pump building of claim 1, further comprising:

a blower for transferring air from at least one of said roof air gap and said wall air gap to at least one of an interior space of the building and outside the building.

7. The solar heat pump building of claim 1 wherein:

at least one duct is horizontally oriented inside at least one of the structural walls and said wall air gap, said at least one duct has at least one opening to transfer air from said wall air gap to to said roof air gap.

8. The solar heat pump building of claim 7, further comprising:

each one of said at least one duct includes at least one damper strip and at least one damper actuator, each one of said at least one duct includes at least one damper slots formed in a length thereof to slidably retain said at least one damper strip, a plurality of holes are formed through said at least one damper strip, a plurality of holes are formed through said at least one damper slot, said at least one actuator slide said at least one damper strip to allow air to flow into or out of said duct.

9. The solar heat pump building of claim 1, further comprising:

a pair of subterranean air ducts being located adjacent said floor of said building, a plurality of subterranean tubing ducts are located below said floor, one end of said plurality of subterranean tubing ducts communicate with one of said pair of subterranean air ducts, the other end of said plurality of subterranean tubing communicate with the other one of said pair of subterranean air ducts, wherein at least one of inside and outside air is flowed through said plurality of subterranean tubing ducts to precondition air temperature and humidity for use within the building to reduce energy consumption.

10. A method of reducing the energy needs of a building, comprising the steps of:

erecting a building having a floor, a peripheral wall and a pitched roof, said peripheral wall extending upward from the floor, said peripheral wall includes a wall air gap, the pitched roof is disposed on a top of the peripheral wall, installing at least one of a plurality of thermally conductive roof purlins and thermally conductive joists, a thermally conductive sheeting is attached to an exterior of the plurality of thermally conductive roof purlins with a plurality of thermal conductive fasteners;

locating a roof insulation layer below said pitched roof to create at least one of a first roof air gap between one side of the peripheral wall and a ridge of the pitched roof, and a second roof air gap between an opposing side of the peripheral wall and the ridge, wherein heat and air is capable of naturally circulating within one of the wall air gap and the roof air gaps in at least one direction; and locating a heat collection coil and dehumidifier inside one of said roof air gaps, said heat collection coil is capable of collecting heat energy from at least one the first roof air gap and the second roof air gap, heat is removed from hot air by said heat collection coil and dehumidifier, the cooled air inside one of the first and second roof air gaps naturally flows out of a colder side of the said heat coil and downward through one of the first and second roof air gaps to said wall air gap, the cooled air continues to flow down said wall air gap, until the air in wall gap air absorbs sufficient heat energy to rise and reverse direction to flow up to one of the first and second roof air gaps.

11. The method of reducing the energy needs of a building of claim 10, further comprising:

a multi-vent including a plurality of vent modules, at least one of said plurality of vent modules includes a box unit and a cover.

12. The method of reducing the energy needs of a building of claim 10, further comprising:

a blower for transferring air from at least one of said roof air gap and said wall air gap to at least one of an interior space of the building and outside the building.

13. The method of reducing the energy needs of a building of claim 10, further comprising:

a pair of subterranean air ducts being located adjacent said floor of said building, a plurality of subterranean tubing ducts are located below said floor, one end of said plurality of subterranean tubing ducts communicate with one of said pair of subterranean air ducts, the other end of said plurality of subterranean tubing communicate with the other one of said pair of subterranean air ducts, means for draining said pair of subterranean tubing ducts of condensed liquid water.

14. A method of reducing the energy needs of a building, comprising the steps of:
   erecting a building having a floor, a peripheral wall and a pitched roof, said pitched roof is supported by a plurality of roof girts and joists, said peripheral wall extending upward from the floor, said pitched roof is disposed on a top of the peripheral wall, locating a roof insulation layer below said pitched roof and installing roof covering over a top of said pitched roof;
   locating a wall insulation layer along an inside plane of one of said plurality of gifts and joists to create at least one wall air gap, said wall air gap is substantially a depth of said plurality of girts and joists, air is capable of naturally circulating within said wall air gap from a lower point to a higher point adjacent an inside surface of a solar heated exterior sheeting of said peripheral wall and from a higher point to a lower point of said wall air gap on a cooler side of said peripheral wall; and
   mounting a heat collection coil and dehumidifier in a high point inside of said wall air gap, substantially centered between an interior surface of a exterior conductive wall sheeting and an exterior surface of said wall insulation layer, said heat collection coil and dehumidifier are mounted in said wall air gap to extract solar heat.

15. The method of reducing the energy needs of a building of claim 14, further comprising:
   a blower for transferring air from said wall air gap to an interior space of said building.

16. The method of reducing the energy needs of a building of claim 14, further comprising:
   a pair of subterranean air ducts being installed adjacent said floor of said building, a plurality of subterranean tubing ducts are installed below said floor and sloped to a low point where at least one drain is installed to remove condensation from the two subterranean tubing ducts, one end of said plurality of subterranean tubing ducts communicate with one of said pair of subterranean air ducts, the other end of said plurality of subterranean tubing communicate with the other one of said pair of subterranean air ducts.

* * * * *